US012633758B2

(12) United States Patent
Feng et al.

(10) Patent No.: US 12,633,758 B2
(45) Date of Patent: May 19, 2026

(54) POWER DEVICE, POWER DEVICE CONTROL METHOD, AND PHOTOVOLTAIC POWER GENERATION SYSTEM

(71) Applicant: Huawei Digital Power Technologies Co., Ltd., Shenzhen (CN)

(72) Inventors: Haoran Feng, Shenzhen (CN); Guilei Gu, Shanghai (CN); Yong Cao, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 18/607,669

(22) Filed: Mar. 18, 2024

(65) Prior Publication Data

US 2025/0183670 A1     Jun. 5, 2025

(30) Foreign Application Priority Data

Nov. 30, 2023   (CN) .......................... 202311627870.7
Dec. 14, 2023   (CN) .......................... 202311728930.4

(51) Int. Cl.
H02J 3/46          (2026.01)
H02J 3/001         (2026.01)
(Continued)

(52) U.S. Cl.
CPC ................ H02J 3/46 (2013.01); H02J 3/001 (2020.01); H02J 3/12 (2013.01); H02J 3/388 (2020.01); H02M 1/32 (2013.01); *H02J 2101/25* (2026.01)

(58) Field of Classification Search
CPC .... H02J 3/46; H02J 3/001; H02J 3/388; H02J 3/12; H02J 2300/26; H02M 1/32
(Continued)

(56) References Cited

U.S. PATENT DOCUMENTS

2008/0238195 A1* 10/2008 Shaver .................. H10F 77/955
                                                            307/18
2013/0328403 A1* 12/2013 Kaufman .................. H02J 3/46
                                                            307/77
(Continued)

FOREIGN PATENT DOCUMENTS

CN      108259068 A      7/2018
JP      2011507465 A      3/2011
(Continued)

*Primary Examiner* — Michael R. Fin
(74) *Attorney, Agent, or Firm* — Maier & Maier, PLLC

(57) ABSTRACT

A component-level power electronics device is able to switch between a shutdown mode, a normal working mode, and a safe working mode, which includes: when the component-level power electronics device fails to receive the periodic communication signal, maintaining or switching to the shutdown mode; when the periodic communication signal received by the component-level power electronics device includes a heartbeat frame and does not include a voltage adjustment instruction, switching to the normal working mode; or when the periodic communication signal received by the component-level electric power electronics device includes the heartbeat frame and also includes the voltage adjustment instruction, switching to the safe working mode. The three working modes can ensure safety of both a device and a person, have a fast response speed, and are easy to implement.

20 Claims, 6 Drawing Sheets

(51) Int. Cl.

| | | |
|---|---|---|
| *H02J 3/12* | (2026.01) | |
| *H02J 3/388* | (2026.01) | |
| *H02M 1/32* | (2007.01) | |
| *H02J 101/24* | (2026.01) | |

(58) Field of Classification Search
USPC ............................................................. 361/1
See application file for complete search history.

(56)  References Cited

U.S. PATENT DOCUMENTS

| | | | |
|---|---|---|---|
| 2013/0334872 A1 | 12/2013 | Kodama et al. | |
| 2016/0254672 A1* | 9/2016 | Yoscovich .............. | H02M 3/04 |
| | | | 307/77 |
| 2021/0288504 A1* | 9/2021 | Horio ...................... | H02J 3/381 |
| 2024/0243696 A1* | 7/2024 | Braginsky .............. | G01R 31/11 |

FOREIGN PATENT DOCUMENTS

| | | | | |
|---|---|---|---|---|
| JP | 2018509868 A | 4/2018 | | |
| JP | 2022551296 A | 12/2022 | | |
| WO | 2013014879 A1 | 1/2013 | | |
| WO | 2017163960 A1 | 9/2017 | | |
| WO | 2021182262 A1 | 9/2021 | | |
| WO | 2022252191 A1 | 12/2022 | | |
| WO | WO 2024196195 * | 3/2024 | ............... | G05F 1/67 |

* cited by examiner

POWER DEVICE, POWER DEVICE CONTROL METHOD, AND PHOTOVOLTAIC POWER GENERATION SYSTEM

CROSS-REFERENCE TO RELATED APPLICATION

This application claims priority to Chinese Patent Application No. 202311728930.4, filed on Dec. 14, 2023 and Chinese Patent Application No. 202311627870.7, filed on Nov. 30, 2023. Both of the aforementioned applications are hereby incorporated by reference in their entireties.

TECHNICAL FIELD

The embodiments relate to the field of power electronics, and to a power device, a power device control method, and a photovoltaic power generation system.

BACKGROUND

At present, with a shortage of non-renewable energy and worsening environmental pollution, photovoltaic power generation is increasingly widely used. The photovoltaic power generation converts a direct current generated by a photovoltaic module into an alternating current by using an inverter, and then the alternating current accesses to an alternating current power grid or is supplied to a load.

The photovoltaic power generation is usually used in a large-scale photovoltaic power station, an industrial and commercial field, and a household field. In the latter two scenarios, photovoltaic modules are usually installed on roofs of buildings, which are close to power consumption users. To obtain large power generation power, the photovoltaic module is usually further formed by a plurality of photovoltaic panels connected in series. Therefore, a direct current voltage on a photovoltaic module side is large. Therefore, a safety hazard that cannot be ignored is generated, to be specific, once the inverter or the photovoltaic module is faulty, a roof on which the photovoltaic module is installed may catch fire. In addition, when the photovoltaic module and the inverter need to be repaired, maintenance personnel face hundreds or even thousands of high-voltage direct currents, and an excessively high direct current voltage on the photovoltaic module side may also cause damage to the inverter. This is not conducive to long-term stable operation of a photovoltaic power generation system.

As a new distributed photovoltaic power generation device, a module-level power electronics (MLPE) device can control a single photovoltaic module. Compared with that of traditional string photovoltaic power generation, power generation efficiency of the MLPE device is improved. Further, how to use the module-level power electronics device to reduce a voltage on the photovoltaic module side when necessary, fully ensure personal safety of a power consumption person or maintenance personnel, protect a power generation device, and improve power generation and maintenance security of a distributed photovoltaic device becomes highly researched.

SUMMARY

The embodiments provide a power conversion device, a working method for controlling a power conversion device, and a photovoltaic power generation system, to fully ensure both security of an inverter device and safety of a user and maintenance personnel, and greatly reduce impact of work such as overhauling, installation, and maintenance on user power consumption.

According to a first aspect, an embodiment includes a power conversion device. The power conversion device includes a direct current conversion unit, a signal processing unit, and a controller. One end of the direct current conversion unit is configured to be connected to a photovoltaic module, and the other end of the direct current conversion unit is configured to be connected to an input end of a next-level power conversion device. The signal processing unit is located on an output side of the power conversion device, and the signal processing unit is configured to receive a periodic communication signal sent by the next-level power conversion device. The controller is configured to: in response to that the signal processing unit fails to receive the periodic communication signal in a time period, control the power conversion device to switch to a shutdown mode or keep working in a shutdown mode, where in the shutdown mode, an output voltage of the power conversion device is a shutdown voltage, and the shutdown voltage is a preset safe voltage value; in response to that the signal processing unit receives the periodic communication signal and the periodic communication signal includes a voltage adjustment instruction, control the power conversion device to switch to a safe working mode or keep working in a safe working mode, where in the safe working mode, the output voltage of the power conversion device is less than a first voltage; in response to that the signal processing unit receives the periodic communication signal but the periodic communication signal does not include the voltage adjustment instruction, control the power conversion device to switch to the normal working mode or keep working in the normal working mode, where in the normal working mode, the output voltage of the power conversion device is less than a second voltage, the second voltage is less than the first voltage, and the second voltage is greater than the shutdown voltage.

In the solution of the first aspect, the next-level power conversion device and the power conversion device have a communication connection and an electrical connection. For example, a communication manner between the next-level power conversion device and the power conversion device is power line communication. On this basis, switching of the working mode of the power conversion device is controlled by using the periodic communication signal. In this way, communication transmission is performed by using an existing power line, thereby reducing costs required for establishing an additional communication line, and communication is performed by using the periodic communication signal, so that a response speed is fast and an implementation is simple. In addition, the power conversion device switches between three working modes. It can be ensured that output power of the power conversion device is maximum in the normal working mode, to meet a power consumption requirement of a user to the greatest extent. In the safe working mode, a fault can be detected in time, and a protection mechanism is started, to ensure security of a next-level power conversion device side device. In shutdown mode, the output voltage of the power conversion device may be reduced to a value lower than the safe voltage, so as to ensure personal safety of maintenance personnel and the user.

According to the first aspect, in a possible implementation, the periodic communication signal is a power line communication (PLC) signal, and the PLC signal includes a heartbeat frame. The controller is configured to: in response to that the signal processing unit fails to receive the heartbeat frame within a time period, control the power conversion device to switch to the shutdown mode or keep working in the shutdown mode. By using PLC and using a heartbeat protection mechanism to determine a communication status between the power conversion device and the next-level power conversion device, the existing power line may be used to accurately control the working mode of the power conversion device in real time based on the communication status between the power conversion device and the next-level power conversion device.

According to the first aspect, in a possible implementation, the controller is configured to: in response to that the signal processing unit receives the PLC signal and the PLC signal includes the heartbeat frame but does not include the voltage adjustment instruction, control the power conversion device to switch to the normal working mode or keep working in the normal working mode; or in response to that the signal processing unit receives the PLC signal and the PLC signal includes both the heartbeat frame and the voltage adjustment instruction, control the power conversion device to switch to the safe working mode or keep working in the safe working mode. The PLC signal includes two forms: the heartbeat frame and the voltage adjustment instruction. According to different cases in which the power conversion device receives the voltage adjustment instruction, the power conversion device is further finely controlled to work in the normal working mode or the safe working mode. In a case in which the heartbeat frame is not interrupted, the power conversion device may also switch between different working modes. In different working modes, the power conversion device may be in a normal power generation state, and can preferentially supply power to the next-level power conversion device, or the power conversion device may be in a safe power generation state, and can preferentially ensure security of the next-level power conversion device when supplying power to the next-level power conversion device.

According to the first aspect, in a possible implementation, when the next-level power conversion device detects that an input end voltage of the next-level power conversion device exceeds an overvoltage threshold, and the next-level power conversion device delivers the voltage adjustment instruction to the power conversion device, the controller controls the output voltage of the power conversion device to be less than the overvoltage threshold. In this implementation, that the next-level power conversion device detects an input end overvoltage of the next-level power conversion device is a triggering condition for the next-level power conversion device to deliver the voltage adjustment instruction to the power conversion device. After the power conversion device receives the voltage adjustment instruction, the controller controls the output voltage of the power conversion device to be less than the overvoltage threshold. In this way, when an overvoltage occurs in the next-level power conversion device, the power conversion device can quickly reduce the output voltage of the power conversion device, thereby ensuring security of the next-level power conversion device.

According to the first aspect, in a possible implementation, when the next-level power conversion device detects that input end power of the next-level power conversion device exceeds an overpower threshold, and the next-level power conversion device delivers the voltage adjustment instruction to the power conversion device, the power conversion device receives the voltage adjustment instruction, and the controller controls the output voltage of the power conversion device to decrease. In this implementation, that the next-level power conversion device detects that input end overpower of the next-level power conversion device is a triggering condition for the next-level power conversion device to deliver the voltage adjustment instruction to the power conversion device. After the power conversion device receives the voltage adjustment instruction, the controller controls the output voltage of the power conversion device to decrease.

In this way, when overpower occurs in the next-level power conversion device, the power conversion device can quickly reduce the output voltage of the power conversion device, thereby ensuring security of the next-level power conversion device.

According to the first aspect, in a possible implementation, when the next-level power conversion device detects that an islanding effect occurs in a power generation system in which the next-level power conversion device is located, and the next-level power conversion device delivers the voltage adjustment instruction to the power conversion device, the power conversion device receives the voltage adjustment instruction, and the controller controls the output voltage of the power conversion device to decrease. In this implementation, that the next-level power conversion device detects that the islanding effect occurs in the next-level power conversion device is a triggering condition for the next-level power conversion device to deliver the voltage adjustment instruction to the power conversion device. After the power conversion device receives the voltage adjustment instruction, the controller controls the output voltage of the power conversion device to decrease. In this way, after the islanding effect occurs, the output voltage is reduced to avoid damage to an electrical device caused by an excessively large fluctuation of a voltage and a frequency in an islanding system.

According to the first aspect, in a possible implementation, after it is detected that a condition in which the input end voltage of the next-level power conversion device exceeds the overvoltage threshold lasts for a time threshold, the next-level power conversion device delivers the voltage adjustment instruction to the power conversion device, to control the output voltage of the power conversion device to be less than the overvoltage threshold. In an actual power generation system, a power grid voltage often fluctuates within a normal range, and the input end voltage of the next-level power conversion device may be restored after a short time deviation from a normal voltage threshold. In this implementation, a time determining condition is added to a voltage adjustment instruction triggering condition, so that an overvoltage misjudgment of the next-level power conversion device that may be caused by a voltage fluctuation of the power grid is eliminated.

According to the first aspect, in a possible implementation, after receiving the voltage adjustment instruction sent by the next-level power conversion device, the power conversion device controls the output voltage of the power conversion device to be 0.5 or 0.1 times a current output voltage of the power conversion device. In this implementation, the output voltage of the power conversion device is reduced to half or one tenth of the original output voltage, thereby minimizing a risk that the next-level power conversion device is faulty due to a long-time overvoltage.

According to the first aspect, in a possible implementation, the direct current conversion unit of the power conversion device includes a buck circuit, a boost circuit, a buck-boost circuit, a forward circuit, and a flyback circuit. The solution provided in the embodiments does not limit a type of a primary conversion circuit of the power conversion device, and adapts to various power conversion devices.

According to the first aspect, in a possible implementation, the controller is configured to: control, in the normal working mode, the direct current conversion unit to work in a maximum power tracking mode, where an output voltage of the direct current conversion unit changes in the maximum power tracking mode, and output power of the photovoltaic module connected to the direct current conversion unit is maximum; and in the secure working mode, control the direct current conversion unit to work in a voltage limiting mode, where the voltage output by the direct current conversion unit is constant in the voltage limiting mode. In the normal working mode, the power conversion device may output power at current maximum power generation power of the photovoltaic module, and a voltage may be variable, to ensure maximization of a power generation capability. In the safe working mode, the output voltage of the power conversion device is constant, and the voltage can effectively ensure security of the next-level power conversion device. The two modes can be changed based on an actual situation to ensure the power generation capability and security of the power conversion device.

According to a second aspect, an embodiment includes a power conversion device control method. The method includes: in response to that a power conversion device fails to receive a heartbeat frame, controlling the power conversion device to be in a shutdown mode, where an output voltage of the power conversion device is a shutdown voltage in the shutdown mode, and the shutdown voltage is a preset safe voltage value; in response to that the power conversion device receives the heartbeat frame and fails to receive a voltage regulation instruction, controlling the power conversion device to be in a normal working mode, where the output voltage of the power conversion device is less than a first voltage in the normal working mode; or in response to that the power conversion device receives the heartbeat frame and receives the voltage regulation instruction, controlling the power conversion device to be in a safe working mode, where the output voltage of the power conversion device is less than a second voltage in the safe working mode, the second voltage is less than the first voltage, and the second voltage is greater than the shutdown voltage.

In the solution of the second aspect, an existing power line is used for communication transmission, thereby reducing costs required for establishing an additional communication line, and communication is performed by using a heartbeat protection mechanism and the voltage adjustment instruction, so that a response speed is fast and an implementation is simple. In addition, the power conversion device switches between three working modes. It can be ensured that output power of the power conversion device is maximum in the normal working mode, to meet a power consumption requirement of a user to the greatest extent. In the safe working mode, a fault can be detected in time, and a protection mechanism is started, to ensure security of an inverter side device. In shutdown mode, the output voltage of the power conversion device may be reduced to a value lower than the safe voltage, so as to ensure safety of maintenance personnel and the user.

According to the second aspect, in a possible implementation, when it is detected that an input end voltage of an inverter exceeds an overvoltage threshold, and the inverter delivers the voltage adjustment instruction to the power conversion device, the output voltage of the power conversion device is controlled to be less than the overvoltage threshold. In this implementation, that the inverter detects that an input end overvoltage of the inverter is a triggering condition for the inverter to deliver the voltage adjustment instruction to the power conversion device. After receiving the voltage adjustment instruction, the power conversion device controls the output voltage of the power conversion device to be less than the overvoltage threshold. In this way, when an overvoltage occurs in the inverter, the power converter can quickly reduce the output voltage of the power conversion device, thereby ensuring security of the inverter.

According to the second aspect, in a possible implementation, when it is detected that input end power of the inverter exceeds an overpower threshold, and the inverter delivers the voltage adjustment instruction to the power conversion device, the power conversion device receives the voltage adjustment instruction, and controls the output voltage of the power conversion device to decrease. In this implementation, that the inverter detects that the input end overpower of the inverter is a triggering condition for the inverter to deliver the voltage adjustment instruction to the power conversion device. After the power conversion device receives the voltage adjustment instruction, a controller controls the output voltage of the power conversion device to decrease. In this way, when overpower occurs in the inverter, the power converter can quickly reduce the output voltage of the power conversion device, thereby ensuring security of the inverter.

According to the second aspect, in a possible implementation, when it is detected that an islanding effect occurs in a power generation system in which the inverter is located, and the inverter delivers the voltage adjustment instruction to the power conversion device, the power conversion device receives the voltage adjustment instruction, and controls the output voltage of the power conversion device to decrease. In this implementation, that the inverter detects that the islanding effect occurs in the inverter is a triggering condition for the inverter to deliver the voltage adjustment instruction to the power conversion device. After the power conversion device receives the voltage adjustment instruction, the controller controls the output voltage of the power conversion device to decrease. In this way, after the islanding effect occurs, the output voltage is reduced to avoid damage to an electrical device caused by an excessively large fluctuation of a voltage and a frequency in an islanding system.

According to a third aspect, an embodiment includes a photovoltaic power generation system. The system includes a plurality of optimizers, an input end of each of the plurality of optimizers is configured to be connected to a photovoltaic module, and an output end of each of the plurality of optimizers is sequentially connected in series. In response to that the plurality of optimizers fail to receive a heartbeat frame, the plurality of optimizers work in a shutdown mode, where output voltages of the plurality of optimizers are shutdown voltages in the shutdown mode, and the shutdown voltage is a preset safe voltage; in response to that the plurality of optimizers receive the heartbeat frame and fail to receive a voltage adjustment instruction, the plurality of optimizers work in a normal working mode, where output voltages of the plurality of optimizers are less than a first voltage in the normal working mode; or in response to that the plurality of optimizers receive the heartbeat frame and receive the voltage adjustment instruction, the optimizers work in a safe working mode, where the output voltages of the plurality of optimizers are less than a second voltage in the safe working mode, the second voltage is less than first voltage, and the second voltage is greater than the shutdown voltage. The system includes an inverter, an input end of the inverter is connected to the output ends that are sequentially connected in series and that are of the plurality of optimizers, an output end of the inverter is configured to be connected to a power grid or a user load. The inverter delivers the heartbeat frame and the voltage adjustment instruction to the plurality of optimizers, and the heartbeat frame and the voltage adjustment instruction are transmitted through a power line between the input end of the inverter or the output end of the optimizer.

In the solution provided in the third aspect, the photovoltaic power generation system includes the plurality of optimizers and the inverter. The plurality of optimizers and the inverter use an existing power line for communication transmission, thereby reducing costs required for establishing an additional communication line, and communication is performed by using a heartbeat protection mechanism and the voltage adjustment instruction, so that a response speed is fast and an implementation is simple. In addition, a power conversion device switches between three working modes. It can be ensured that output power of the power conversion device is maximum in the normal working mode, to meet a power consumption requirement of a user to the greatest extent. In the safe working mode, a fault can be detected in time, and a protection mechanism is started, to ensure security of an inverter side device. In the shutdown mode, an output voltage of the power conversion device may be reduced to a value lower than the safe voltage, so as to ensure safety of maintenance personnel and the user.

According to the third aspect, in a possible implementation, when it is detected that an input end voltage of the inverter exceeds an overvoltage threshold, and the inverter delivers the voltage adjustment instruction to the power conversion device, the output voltage of the power conversion device is controlled to be less than the overvoltage threshold. In this implementation, that the inverter detects that an input end overvoltage of the inverter is a triggering condition for the inverter to deliver the voltage adjustment instruction to the power conversion device. After receiving the voltage adjustment instruction, the power conversion device controls the output voltage of the power conversion device to be less than the overvoltage threshold. In this way, when an overvoltage occurs in the inverter, the power conversion device can quickly reduce the output voltage of the power conversion device, thereby ensuring security of the inverter.

According to the third aspect, in a possible implementation, when it is detected that input end power of the inverter exceeds an overpower threshold, and the inverter delivers the voltage adjustment instruction to the power conversion device, the power conversion device receives the voltage adjustment instruction, and controls the output voltage of the power conversion device to decrease. In this implementation, that the inverter detects that the input end overpower of the inverter is a triggering condition for the inverter to deliver the voltage adjustment instruction to the power conversion device. After the power conversion device receives the voltage adjustment instruction, a controller controls the output voltage of the power conversion device to decrease. In this way, when overpower occurs in the inverter, the power conversion device can quickly reduce the output voltage of the power conversion device, thereby ensuring security of the inverter.

According to the third aspect, in a possible implementation, when it is detected that an islanding effect occurs in a power generation system in which the inverter is located, and the inverter delivers the voltage adjustment instruction to the power conversion device, the power conversion device receives the voltage adjustment instruction, and controls the output voltage of the power conversion device to decrease. In this implementation, that the inverter detects that the islanding effect occurs in the inverter is a triggering condition for the inverter to deliver the voltage adjustment instruction to the power conversion device. After the power conversion device receives the voltage adjustment instruction, the controller controls the output voltage of the power conversion device to decrease. In this way, after the islanding effect occurs, the output voltage is reduced to avoid damage to an electrical device caused by an excessively large fluctuation of a voltage and a frequency in an islanding system.

According to the third aspect, in a possible implementation, the inverter establishes communication with the optimizer when a startup condition is met. Communication content includes the heartbeat frame or the voltage adjustment instruction. After detecting an alarm signal, the inverter interrupts communication with the optimizer and performs a shutdown action. In this way, when a working condition is met, the inverter and the optimizer may establish communication the first time to quickly perform power generation work. In addition, after an alarm occurs, the inverter may cut off communication with the optimizer the first time, and the optimizer is enabled to enter the safe working mode to ensure security of the inverter.

According to a fourth aspect, an embodiment includes a power conversion device. The power conversion device includes a direct current conversion unit, a signal processing unit, and a controller. The direct current conversion unit is configured to convert a direct current generated by a photovoltaic module and output a converted direct current to a next-level power conversion device. The signal processing unit is connected to an output of the power conversion device, and is configured to receive a periodic communication signal sent by the next-level power conversion device. The controller is configured to: in response to that the signal processing unit fails to receive the periodic communication signal within a time period, control an output voltage of the power conversion device to be a shutdown voltage, where the shutdown voltage is a preset safe voltage value; in response to that the signal processing unit receives the periodic communication signal but the periodic communication signal does not include a voltage adjustment instruction, control the output voltage of the power conversion device to be less than or equal to a first voltage; or in response to that the signal processing unit receives the periodic communication signal and the periodic communication signal includes the voltage adjustment instruction, control the output voltage of the power conversion device to be less than or equal to a second voltage, where the second voltage is less than the first voltage, and the second voltage is greater than the shutdown voltage.

In the solution of the fourth aspect, the next-level power conversion device and the power conversion device have a communication connection and an electrical connection. For example, a communication manner between the next-level power conversion device and the power conversion device is power line communication. On this basis, the periodic communication signal is used to control a value of the output voltage of the power conversion device. In this way, communication transmission is performed by using an existing power line, thereby reducing costs required for establishing an additional communication line, and communication is performed by using the periodic communication signal, so that a response speed is fast and an implementation is simple. In addition, the output voltage of the power conversion device is related to three voltage values. When the output voltage is less than or equal to the first voltage, it can be ensured that output power of the power conversion device is maximum, to meet a power consumption requirement of a user to the greatest extent. When the output voltage is less than or equal to the second voltage, a protection mechanism may be started in time, to ensure security of a next-level power conversion device side device. When the output voltage is the shutdown voltage, the output voltage of the power conversion device may be reduced to a value lower than the safe voltage, so as to ensure personal safety of maintenance personnel and the user.

According to the fourth aspect, in a possible implementation, the periodic communication signal is a PLC signal, and the PLC signal includes a heartbeat frame. The controller is configured to: in response to that the signal processing unit fails to receive the heartbeat frame within a time period, control the output voltage of the power conversion device to be the shutdown voltage. By using PLC and using a heartbeat protection mechanism to determine a communication status between the power conversion device and the next-level power conversion device, the existing power line may be used to accurately control, in real time based on the communication status between the power conversion device and the next-level power conversion device, the output voltage of the power conversion device.

According to the fourth aspect, in a possible implementation, the controller is configured to: in response to that the signal processing unit receives the PLC signal and the PLC signal includes the heartbeat frame but does not include the voltage adjustment instruction, control the output voltage of the power conversion device to be less than the first voltage; or in response to that the signal processing unit receives the PLC signal and the PLC signal includes both the heartbeat frame and the voltage adjustment instruction, control the output voltage of the power conversion device to be less than the second voltage. The PLC signal includes two forms: the heartbeat frame and the voltage adjustment instruction. According to different cases in which the power conversion device receives the voltage adjustment instruction, the output voltage of the power conversion device is further finely controlled to be less than or equal to the first voltage or the second voltage. In a case in which the heartbeat frame is not interrupted, the power conversion device may output different voltages. Therefore, the power conversion device may be in a normal power generation state, and can preferentially supply power to the next-level power conversion device, or the power conversion device may be in a safe power generation state, and can preferentially ensure security of the next-level power conversion device when supplying power to the next-level power conversion device.

According to the fourth aspect, in a possible implementation, the controller is configured to: in response to that the signal processing unit receives the PLC signal and the PLC signal includes both the heartbeat frame and the voltage adjustment instruction, adjust the output voltage of the power conversion device to K times a current output voltage of the power conversion device, where K is less than 1 or K is 0.5 or 0.1. In this implementation, the output voltage of the power conversion device is reduced to half or one tenth of the original output voltage, thereby minimizing a risk that the next-level power conversion device is faulty due to a long-time overvoltage.

According to the fourth aspect, in a possible implementation, the controller is configured to: in response to that the signal processing unit receives the periodic communication signal but the periodic communication signal does not include the voltage adjustment instruction, control the direct current conversion unit to work in a maximum power tracking mode, where an output voltage of the direct current conversion unit changes in the maximum power tracking mode, and output power of the photovoltaic module connected to the direct current conversion unit is maximum; or in response to that the signal processing unit receives the periodic communication signal and the periodic communication signal includes the voltage adjustment instruction, control the direct current conversion unit to work in a voltage limiting mode, where the output voltage of the direct current conversion unit is constant in the voltage limiting mode. When the output voltage of the power conversion device is less than or equal to the first voltage, the direct current conversion unit works in the maximum power tracking mode, and the power conversion device may output power at current maximum power generation power of the photovoltaic module, and a voltage may be variable, to ensure maximization of a power generation capability. When the output voltage of the power conversion device is less than or equal to the second voltage, the direct current conversion unit works in the voltage limiting mode, the output voltage of the power conversion device is constant, and the voltage can effectively ensure security of the next-level power conversion device. The two modes can be changed based on an actual situation to ensure the power generation capability and security of the power conversion device.

According to a fifth aspect, an embodiment includes a power conversion device control method. The method includes: in response to that a power conversion device fails to receive a heartbeat frame, controlling an output voltage of the power conversion device to be a shutdown voltage, where the shutdown voltage is a preset safe voltage value; in response to that the power conversion device receives the heartbeat frame and fails to receive a voltage adjustment instruction, controlling the output voltage of the power conversion device to be less than or equal to a first voltage; or in response to that the power conversion device receives the heartbeat frame and receives the voltage adjustment instruction, controlling the output voltage of the power conversion device to be less than or equal to a second voltage, where the second voltage is less than the first voltage, and the second voltage is greater than the shutdown voltage.

In the solution of the fifth aspect, an existing power line is used for communication transmission, thereby reducing costs required for establishing an additional communication line, and communication is performed by using a heartbeat protection mechanism and the voltage adjustment instruction, so that a response speed is fast and an implementation is simple. In addition, the output voltage of the power conversion device is related to three voltage values. When the output voltage is less than or equal to the first voltage, it can be ensured that output power of the power conversion device is maximum, to meet a power consumption requirement of a user to the greatest extent. When the output voltage is less than or equal to the second voltage, a protection mechanism may be started in time, to ensure safety of a next-level power conversion device-side device. When the output voltage is the shutdown voltage, the output voltage of the power conversion device may be reduced a value below the safe voltage, so as to ensure personal safety of maintenance personnel and the user.

According to the fifth aspect, in a possible implementation, when it is detected that an input end voltage of an inverter exceeds an overvoltage threshold, the inverter is configured to: when receiving direct current power output by the power conversion device and delivering the voltage adjustment instruction to the power conversion device, control the output voltage of the power conversion device to be less than the overvoltage threshold. In this implementation, that the inverter detects that the input end overvoltage of the inverter is a triggering condition for the inverter to deliver the voltage adjustment instruction to the power conversion device. After receiving the voltage adjustment instruction, the power conversion device controls the output voltage of the power conversion device to be less than the overvoltage threshold. In this way, when an overvoltage occurs in the inverter, the power conversion device can quickly reduce the output voltage of the power conversion device, thereby ensuring security of the inverter.

According to the fifth aspect, in a possible implementation, when it is detected that input end power of the inverter exceeds an overpower threshold, the inverter is configured to receive the direct current power output by the power conversion device, deliver the voltage adjustment instruction to the power conversion device, and control the output voltage of the power conversion device to decrease. In this implementation, that the inverter detects that the input end overpower of the inverter is a triggering condition for the inverter to deliver the voltage adjustment instruction to the power conversion device. After the power conversion device receives the voltage adjustment instruction, a controller controls the output voltage of the power conversion device to decrease. In this way, when overpower occurs in the inverter, the power conversion device can quickly reduce the output voltage of the power conversion device, thereby ensuring security of the inverter.

According to the fifth aspect, in a possible implementation, when it is detected that an islanding effect occurs in a power generation system in which the inverter is located, the inverter is configured to receive the direct current power output by the power conversion device, deliver the voltage adjustment instruction to the power conversion device, and control the output voltage of the power conversion device to decrease. In this implementation, that the inverter detects that the islanding effect occurs in the inverter is a triggering condition for the inverter to deliver the voltage adjustment instruction to the power conversion device. After the power conversion device receives the voltage adjustment instruction, the controller controls the output voltage of the power conversion device to decrease. In this way, after the islanding effect occurs, the output voltage is reduced to avoid damage to an electrical device caused by an excessively large fluctuation of a voltage and a frequency in an islanding system.

According to a sixth aspect, an embodiment includes a photovoltaic power generation system. The photovoltaic power generation system includes a plurality of optimizers, where the plurality of optimizers are configured to convert a direct current generated by a photovoltaic module and output a converted direct current to an inverter; and the inverter, where the inverter is configured to supply power to a power grid or a user load, the inverter is further configured to send a heartbeat frame and a voltage adjustment instruction to the plurality of optimizers, and the heartbeat frame and the voltage adjustment instruction are transmitted through a power line between the inverter and the optimizer. In response to that the plurality of optimizers fail to receive the heartbeat frame within a time period, output voltages of the plurality of optimizers are shutdown voltages, where the shutdown voltage is a preset safe voltage value. In response to that the plurality of optimizers receive the heartbeat frame but fail to receive the voltage adjustment instruction, the output voltages of the plurality of optimizers are less than or equal to a first voltage. Alternatively, in response to that the plurality of optimizers receive the heartbeat frame and receive the voltage adjustment instruction, the output voltages of the plurality of optimizers are less than or equal to a second voltage, where the second voltage is less than the first voltage, and the second voltage is greater than the shutdown voltage.

In the solution provided in the sixth aspect, the photovoltaic power generation system includes the plurality of optimizers and the inverter. The plurality of optimizers and the inverter use an existing power line for communication transmission, thereby reducing costs required for establishing an additional communication line, and communication is performed by using a heartbeat protection mechanism and the voltage adjustment instruction, so that a response speed is fast and an implementation is simple. In addition, an output voltage of a power conversion device is related to three voltage values. When the output voltage is less than or equal to the first voltage, it can be ensured that output power of the power conversion device is maximum, to meet a power consumption requirement of a user to the greatest extent. When the output voltage is less than or equal to the second voltage, a protection mechanism may be started in time, to ensure security of a next-level power conversion device side device. When the output voltage is a shutdown voltage, the output voltage of the power conversion device may be reduced to a value lower than the safe voltage, so as to ensure safety of maintenance personnel and the user.

According to the sixth aspect, in a possible implementation, when an input end voltage of the inverter exceeds an overvoltage threshold, the inverter delivers the voltage adjustment instruction to the optimizer, and the optimizer controls an output voltage of the optimizer to be less than the second voltage. In this implementation, that the inverter detects that an input end overvoltage of the inverter is a triggering condition for the inverter to deliver the voltage adjustment instruction to the power conversion device. After receiving the voltage adjustment instruction, the power conversion device controls the output voltage of the power conversion device to be less than the second voltage. In this way, when an overvoltage occurs in the inverter, the power conversion device can quickly reduce the output voltage of the power conversion device, thereby ensuring security of the inverter.

According to the sixth aspect, in a possible implementation, when input end power of the inverter exceeds an overpower threshold, the inverter delivers the voltage adjustment instruction to the optimizer, and the optimizer controls the output voltage of the optimizer to be less than the second voltage. In this implementation, that the inverter detects that the input end power of the inverter is a triggering condition for the inverter to deliver the voltage adjustment instruction to the power conversion device. After the power conversion device receives the voltage adjustment instruction, a controller controls the output voltage of the power conversion device to be less than the second voltage. In this way, when overpower occurs in the inverter, the power conversion device can quickly reduce the output voltage of the power conversion device, thereby ensuring security of the inverter.

According to the sixth aspect, in a possible implementation, in response to that some or all of the plurality of optimizers fail to receive the heartbeat frame within a time period, the optimizer that fails to receive the heartbeat frame adjusts the output voltage to the shutdown voltage, where the shutdown voltage is the preset safe voltage value; or in response to that the plurality of optimizers receive the heartbeat frame and fail to receive the voltage adjustment instruction, the output voltages of the plurality of optimizers are less than or equal to the first voltage; or in response to that the plurality of optimizers receive the heartbeat frame and receive the voltage adjustment instruction, the output voltages of the plurality of optimizers are less than or equal to the second voltage, the second voltage is less than the first voltage, and the second voltage is greater than the shutdown voltage. Due to PLC signal transmission, the plurality of optimizers establish communication with the inverter by using the heartbeat frame and the voltage adjustment instruction, and change the output voltages of the plurality of optimizers based on different situations of the received heartbeat frame and voltage adjustment instruction. The communication method is simple and reliable.

According to the sixth aspect, in a possible implementation, when an islanding effect occurs in a power generation system in which the inverter is located, the inverter delivers the voltage adjustment instruction to the optimizer, and the optimizer controls the output voltage of the optimizer to be less than the second voltage. In this implementation, that the inverter detects that the islanding effect occurs in the inverter is a triggering condition for the inverter to deliver the voltage adjustment instruction to the power conversion device. After the power conversion device receives the voltage adjustment instruction, the controller controls the output voltage of the power conversion device to be less than the second voltage. In this way, after the islanding effect occurs, the output voltage is reduced to avoid damage to an electrical device caused by an excessively large fluctuation of a voltage and a frequency in an islanding system.

According to the sixth aspect, in a possible implementation, the inverter establishes communication with the optimizer when a startup condition is met. Communication content includes the heartbeat frame or the voltage adjustment instruction. After detecting an alarm signal, the inverter interrupts communication with the optimizer and performs a shutdown action. In this way, when a working condition is met, the inverter and the optimizer may establish communication the first time to quickly perform power generation work. In addition, after an alarm occurs, the inverter may cut off communication with the optimizer the first time, and the optimizer is enabled to enter a safe working mode to ensure security of the inverter.

According to the sixth aspect, in a possible implementation, inputs of the plurality of optimizers are configured to respectively connect to photovoltaic modules, and outputs of the plurality of optimizers are connected in series and then connected to an input of the inverter. The inverter is configured to send the heartbeat frame and the voltage adjustment instruction to the plurality of optimizers in a broadcasting manner through PLC, and the voltage adjustment instruction adjusts the output voltage of the power conversion device to K times current output voltages of the power conversion device, where K is less than 1 or K is 0.5 or 0.1. In this implementation, the output voltage of the power conversion device is reduced to half or one tenth of the original output voltage, thereby minimizing a risk that the next-level power conversion device is faulty due to a long-time overvoltage.

DETAILED DESCRIPTION OF EMBODIMENTS

Figure 1:
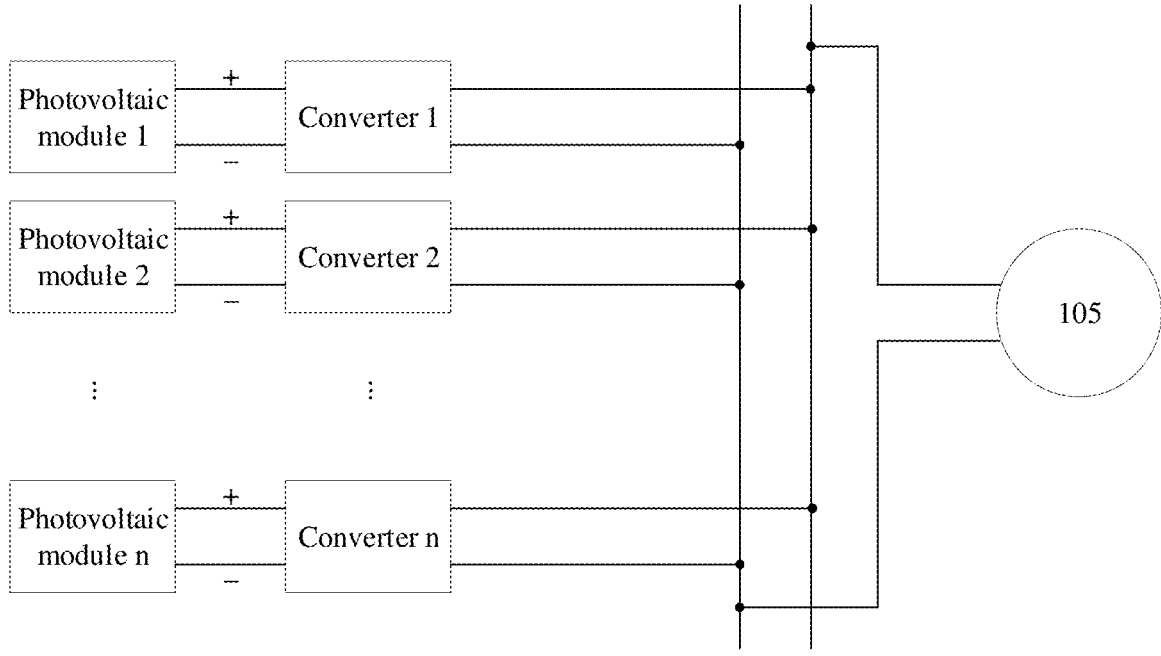
FIG. 1 is a schematic diagram of an architecture of a photovoltaic system according to an embodiment.

The solutions in this embodiments are described below with reference to the accompanying drawings.

In the embodiments, unless otherwise expressly specified and limited, a term "connected" should be understood in a broad sense. For example, "connected" may be a fixed connection, or may be a detachable connection or be integrated, which may be directly connected or indirectly connected by using an intermediate medium. In addition, a term "coupling" may be a manner of implementing an electrical connection for signal transmission. "Coupling" may be a direct electrical connection, or may be an indirect electrical connection by using an intermediate medium.

For ease of understanding, some proper nouns are first described.

Module-level power electronics device: Different from a string-type power electronics device, the module-level power electronics device provides a maximum power point tracking (MPPT) function and a monitoring function, to further improve power generation of a photovoltaic power generation system. The module-level power electronics device can also implement a module-level rapid shutdown (RSD) function with an appropriate shutdown policy. This greatly improves security of the photovoltaic power generation system.

MPPT function: A back-end input voltage is controlled to work at a maximum power point voltage (Vmpp) of a photovoltaic module to implement maximum output power of the photovoltaic module.

PLC: Power Line Communication is also called carrier communication, is a communication manner in which an existing power line is used as an information transmission medium to transmit data or information in a form of digital signal.

Mismatch: For a plurality of photovoltaic modules connected in series or in parallel, when environmental conditions (such as radiation and a temperature) of some photovoltaic modules in the plurality of photovoltaic modules are different from those of other photovoltaic modules, power of the plurality of photovoltaic modules connected in series or in parallel is less than a sum of respective maximum power points of the photovoltaic modules.

Heartbeat protection mechanism: The heartbeat protection mechanism is a security monitoring mechanism, in a communication system, used to determine whether communication between devices is normal. In this mechanism, a master machine periodically sends a heartbeat frame to a slave machine. After receiving the heartbeat frame, the slave machine sends feedback to the master machine to notify the master machine that a communication connection is normal. If the master machine does not receive feedback information, the master machine takes a remedial measure such as a reconnection attempt. In some systems, after receiving a heartbeat frame, the slave machine does not send feedback to the master machine, but determines, by itself, whether communication is abnormal based on whether the heartbeat frame is received, and performs a corresponding operation on the slave machine.

Islanding effect: In a distributed power generation system, when a power grid trips due to a fault or power outage, a distributed grid-tied power generation system (such as photovoltaic power generation, wind power generation, and fuel cell power generation) on each user side cannot detect a power outage state in time and disconnect itself from a mains network. As a result, a self-supply islanding power generation system having the distributed grid-tied power generation system and its connected load is formed.

FIG. 1 is a schematic diagram of an architecture of a photovoltaic system according to an embodiment. In this embodiment, the photovoltaic system includes a plurality of converters 1 to n, positive and negative input ends of the converter 1 to the converter n are configured to be respectively connected to positive and negative output ends of photovoltaic modules 1 to n in a one-to-one correspondence, and output ends of the converter 1 to the converter n are connected in parallel and then coupled to a power grid 105. In this architecture, a plurality of photovoltaic modules may be coupled to the power grid 105 by using the converter, and are coupled to the power grid 105 in parallel by using output ends of the plurality of converters, so that the power grid has a relatively large power supply capability.

Because output power of a single photovoltaic cell is low, the photovoltaic module may be formed by combining a plurality of photovoltaic cells in series or in parallel, so that output power of the photovoltaic module increases. Composition of the photovoltaic module is not limited.

The converter 1 to the converter n are configured to convert direct currents of the photovoltaic module 1 to the photovoltaic module n into alternating currents transmitted to the power grid, to implement photovoltaic power generation. In addition, the converter 1 to the converter n are connected to the output ends of the photovoltaic module 1 to the photovoltaic module n in a one-to-one correspondence, and are configured to control an output voltage of each of the photovoltaic module 1 to the photovoltaic module n, to implement maximum power tracking of the photovoltaic module 1 to the photovoltaic module n.

The converters 1 to n include a micro inverter. The micro inverter is a miniaturized and highly integrated power conversion device, and may be installed at a position near a photovoltaic module on a roof of a building, and has functions such as an inversion function, an MPPT function, and a module-level shutdown or monitoring function. The micro inverter is applied to this architecture, and may implement the following process: a photovoltaic module 1 is used as an example, the photovoltaic module 1 converts solar energy into a direct current, and a converter 1 may convert the direct current into an alternating current that has a specific electrical parameter such as a specific frequency and a specific voltage, and is required by the power grid 105. Then the alternating current is provided for use by a load.

It should be understood that, in this embodiment, a single photovoltaic module is correspondingly connected to a single converter, but there is also a case in which the plurality of photovoltaic modules are correspondingly connected to a single converter. A quantity of photovoltaic modules that are correspondingly connected to the converter is not limited. The micro inverter is used as an example. A solution of "one-to-one" of the micro inverter is that a single photovoltaic module is correspondingly connected to a single micro inverter, and solutions of "one-to-two" and "one-to-four" of the micro inverter are: two photovoltaic modules are correspondingly connected to a single micro inverter; and four photovoltaic modules are correspondingly connected to a single micro inverter.

Figure 2:
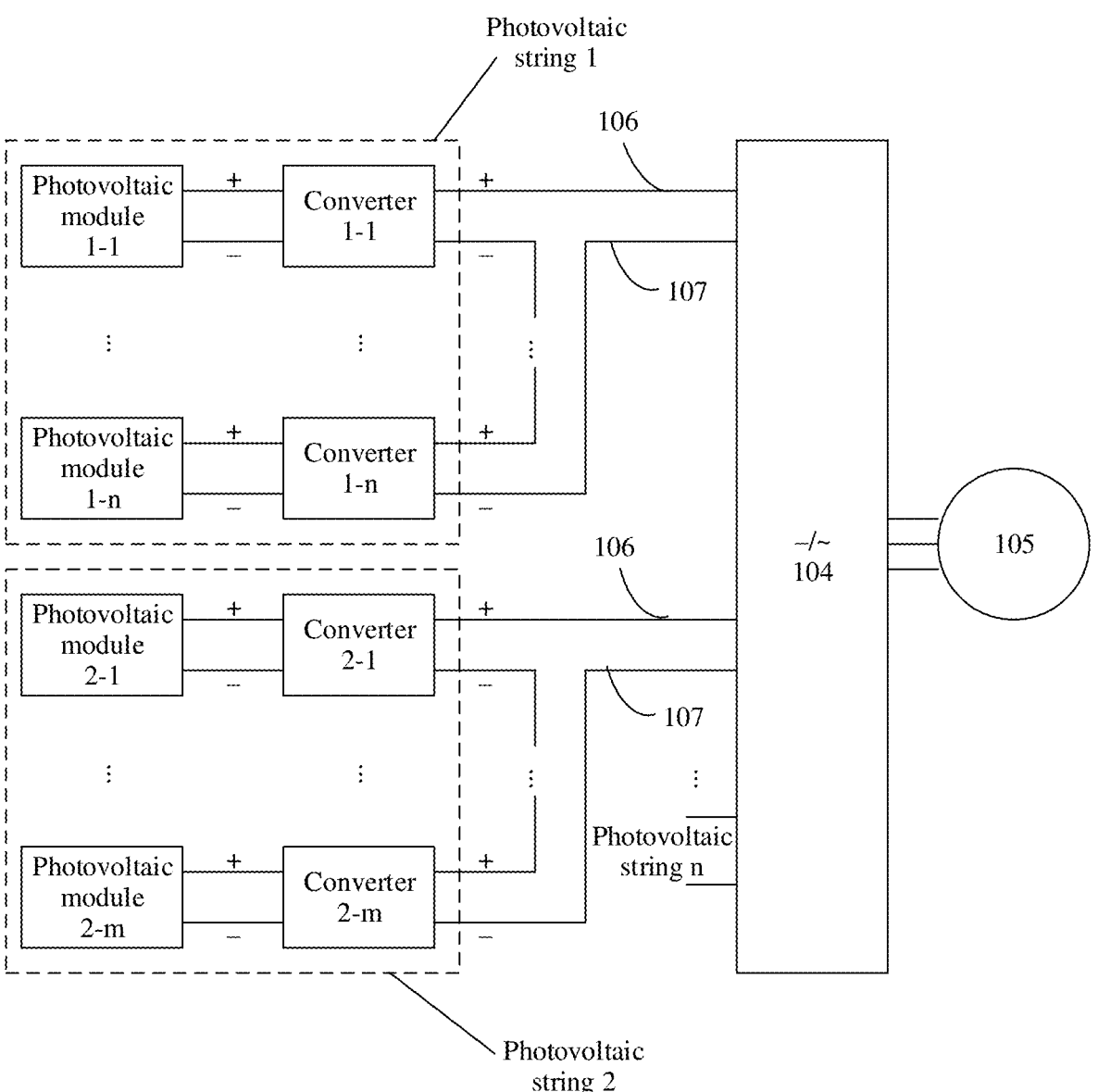
FIG. 2 is a schematic diagram of an architecture of another photovoltaic system according to an embodiment.

FIG. 2 is a schematic diagram of a structure of another photovoltaic system according to an embodiment. The photovoltaic system includes a converter 1-$n$, a converter 2-$m$, and an inverter 104. Input ends of the converters 1-$n$ and 2-$m$ are configured to be respectively connected to output ends of a photovoltaic module 1-$n$ and a photovoltaic module 2-$m$ in a one-to-one correspondence. The converters are connected in series to form p photovoltaic strings, where p is greater than or equal to 2, output ends of converters 1-1 to 1-$n$ are connected in series to form a photovoltaic string 1, and output ends of converters 2-1 to 2-$m$ are connected in series to form another photovoltaic string 2.

An input end of the converter 1-1 in the photovoltaic string 1 is connected to a photovoltaic module 1-1, an input end of the converter 1-$n$ is connected to a photovoltaic module 1-$n$, and the output ends of the converter 1-1 to the converter 1-$n$ are connected in series together, and are connected to an input end of the inverter 104 through a positive direct current power line 106 and a negative direct current power line 107. Similarly, an input end of the converter 2-1 in the photovoltaic string 2 is connected to a photovoltaic module 2-1, the input end of the converter 2-$m$ is connected to the photovoltaic module 2-$m$, and the output ends of the converter 2-1 to the converter 2-$m$ are connected in series together, and are connected to the input end of the inverter 104 through a positive direct current power line 106 and a negative direct current power line 107.

An output end of the inverter 104 is connected to a power grid 105. The inverter 104 is a three-phase inverter, and the power grid 105 is a three-phase alternating current power grid. Alternatively, the inverter 104 may be a home-used single-phase inverter, and the corresponding power grid 105 is a home-used alternating current power grid.

It should be understood that, in an implementation solution, the converter may be a shutdown device. The shutdown device has a module shutdown function, and is a module-level power electronics device installed between a photovoltaic module and an inverter. The shutdown device can quickly shut down a connection between each photovoltaic module and the inverter, and is generally installed on a building roof near a photovoltaic module side.

In another implementation solution, the converter may be an optimizer. The optimizer is a power conversion device installed between a photovoltaic module and an inverter, can eliminate a mismatch phenomenon of the photovoltaic module, and have an MPPT function of a single photovoltaic module, thereby greatly improving power generation of an entire photovoltaic power generation system. The optimizer is used in this architecture, and may implement the following process. The photovoltaic string 1 is used as an example. Each of the photovoltaic module 1-1 to the photovoltaic module 1-$n$ converts solar energy into a direct current, and after power conversion is performed by the correspondingly connected optimizers 1-1 to 1-$n$, direct currents output by the plurality of converters are connected in series to an input end of the inverter 104. Compared with the optimizer, the inverter is a next-level power conversion device of the optimizer. The input end of the inverter 104 is referred to as a "one channel" input of the inverter. Similarly, the photovoltaic string 2 also combines output direct currents in series, and transmits the output direct currents to the input end of the inverter 104 in a manner of another "one channel". In this embodiment, the optimizer further has a module-level fast shutdown function, thereby further reducing a security risk of the photovoltaic power generation system.

With reference to the accompanying drawings, the following describes implementation of a maximum power tracking function and a fast shutdown function of a component-level power electronics device provided in the embodiments. For ease of description, the following uses an optimizer as an example for description. It should be understood that a manner of implementing fast shutdown described below is not limited to the optimizer, which is also applicable to more component-level power electronics devices shown in FIG. 1 and FIG. 2.

In addition, a meaning of the fast shutdown function of the module-level power electronics device function provided in the embodiments is not limited to isolating the module-level power electronics device from the photovoltaic power generation system, which is simply reflected by literal "shutdown". This also reflects that an output voltage, an output current, or output power of the component-level power electronics device is reduced below a specific voltage.

Figure 3:
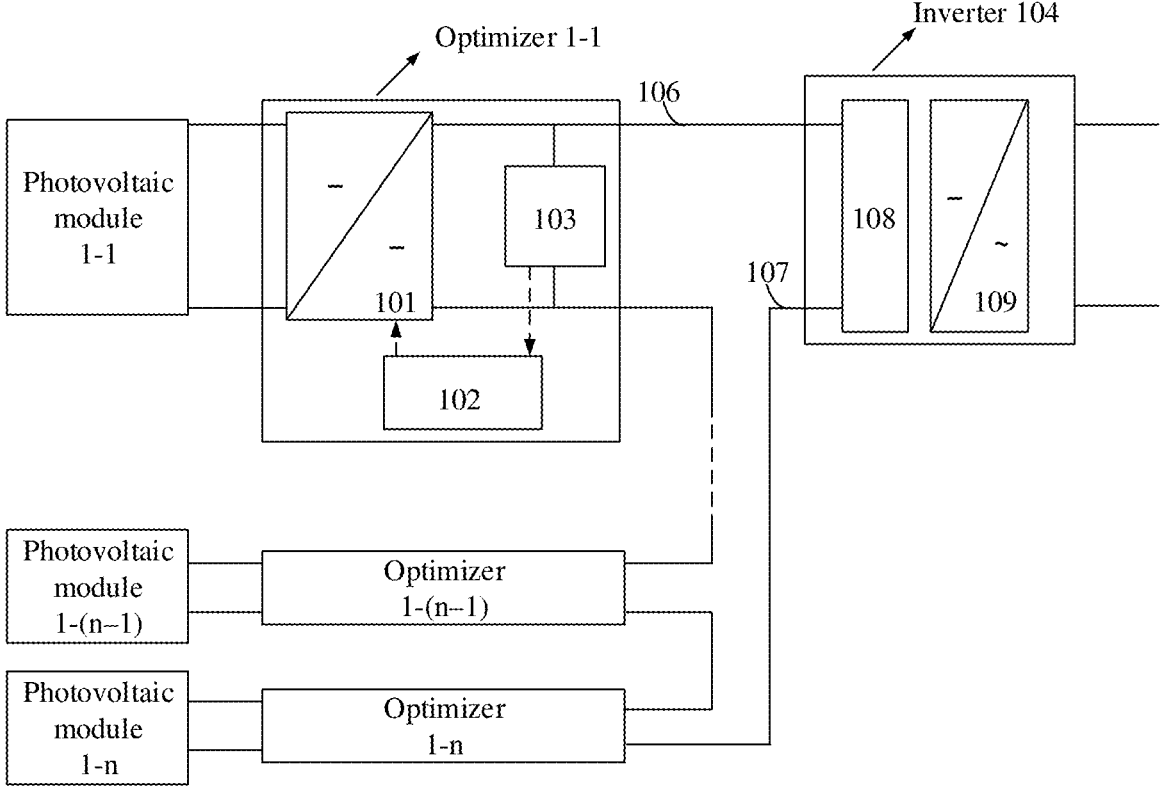
FIG. 3 is a schematic diagram of an optimizer-inverter connection according to an embodiment.

Based on a connection relationship between the photovoltaic string 1 and the inverter 104 in FIG. 2, FIG. 3 is a schematic diagram of an optimizer-inverter connection according to this embodiment. The photovoltaic modules are respectively connected to the optimizers in a one-to-one correspondence. For example, the output end of the photovoltaic module 1-1 is connected to the input end of the optimizer 1-1, the output end of the photovoltaic module 1-($n$−1) is connected to the input end of the optimizer 1-($n$−1), and the output end of the photovoltaic module 1-$n$ is connected to the input end of the optimizer 1-$n$. The output ends of the plurality of optimizers 1-1 are connected in series and then connected to the inverter 104 as an input of the inverter 104. For example, one output end of the optimizer 1-1 is connected to one input end of the inverter 104, and another output end of the optimizer 1-1 is connected to one output end of the connected optimizer 1-2. Similarly, one output end of the optimizer 1-($n$−1) is connected to one output end of the connected optimizer 1-($n$−2), another output end of the optimizer 1-($n$−1) is connected to an output end of the optimizer 1-$n$, and another output end of the optimizer 1-$n$ is connected to another input end of the inverter 104. Further, the optimizer 1-1 is used as an example, the optimizer 1-1 includes a direct current conversion unit 101, a signal processing unit 103, and a control unit 102, and the inverter 104 includes an inverter 104 signal transceiver unit 108 and an inverter circuit 109. The optimizer 1-1 is connected to the inverter 104 through the positive direct current power line 106, and the optimizer 1-$n$ is connected to the inverter 104 through negative direct current power line 107.

The direct current conversion unit 101 includes one or a combination of a buck circuit (buck converters), a boost circuit (boost converters), a buck-boost circuit (buck-boost converters), a forward circuit (forward converters), or a flyback circuit (flyback converters). On one hand, the direct current conversion unit 101 is configured to work in an MPPT tracking mode. For example, in the photovoltaic system architecture provided in the embodiments, one optimizer is correspondingly connected to one photovoltaic module, and a power output characteristic curve of the photovoltaic module is affected by factors such as a temperature, solar radiation, or shadow. The direct current conversion unit 101 of the optimizer includes a plurality of switching transistors, and the optimizer controls a duty ratio of the one or more switching transistors through pulse width modulation, so that an input voltage of the optimizer tracks a maximum power point operating voltage of the photovoltaic module, and the photovoltaic module maintains a maximum power output. On the other hand, the direct current conversion unit 101 is configured to work in a voltage limiting mode. In this mode, the optimizer controls the duty ratio of the one or more switching transistors through pulse width modulation, so that an output voltage of the optimizer is a specific voltage threshold. Under the specific voltage threshold, the inverter 104 has a lower input voltage than that before the voltage is adjusted, or maintains an input voltage of the inverter within a bearable range, so as to protect the inverter. In short, the direct current conversion unit 101 may output different voltage values according to different operation strategies to meet different running requirements of the photovoltaic system.

The signal processing unit 103 and the signal transceiver unit 108 are configured to receive or send PLC signals. It should be understood that a coupling manner between the signal processing unit 103 and the inverter 104 shown in FIG. 3 is an example. The coupling manner between the signal processing unit 103 and the inverter 104 includes dual-side coupling (coupled to two sides output by the inverter) and single-side coupling (coupled to one side output by the inverter), and a coupling type includes transformer coupling and magnetic ring coupling. The embodiments do not limit the coupling manner and the coupling type between the signal processing unit 103 and the inverter 104.

The control unit 102 is configured to control, based on information received by the signal processing unit 103 or based on running information prestored in the signal processing unit 103, the switching transistor in the direct current conversion unit 101 in the optimizer to be closed or shutdown.

The inverter circuit 109 is configured to convert a direct current into an alternating current.

In a same photovoltaic string, other optimizers except the optimizer 1-1 and the optimizer 1-$n$ are not directly connected to the inverter 104. However, because the output ends of the plurality of optimizers are connected in series, an optimizer signal processing unit in each optimizer may process a signal sent by the inverter 104 in a broadcasting manner, so that each optimizer can receive an instruction from the inverter 104 and perform a corresponding action.

In the photovoltaic system in the embodiment shown in FIG. 1 or FIG. 2, the inverter 104 and the optimizer not only have an electrical connection manner, but also have a PLC connection manner. In addition to the PLC connection, a communication manner between the inverter 104 and the optimizer further includes connection manners such as RS485, Zigbee, and sub-1G. This embodiment can be described by using the PLC manner.

The following describes in detail an implementation process of PLC with reference to the photovoltaic system shown in FIG. 3.

Refer to FIG. 3. In the photovoltaic system in a PLC manner, the inverter 104 and the optimizers 1-1 to 1-$n$ exchange data through the power line 106 or 107 shown in FIG. 3.

The optimizer 1-1 is used as an example. Because data exchange exists between the optimizer 1-1 and the inverter 104, and the data exchange is indispensable for maintaining normal running of the inverter 104 and the optimizer 1-1, it is important to ensure reliability of the PLC manner. To ensure communication reliability and ensure that the optimizer 1-1 and the inverter 104 are not loss of communication or are not disconnected, in this embodiment, a heartbeat protection mechanism is used to detect a communication status between the inverter 104 and the optimizer 1-1.

In an implementation, in the heartbeat protection mechanism, a master machine is the inverter 104, and a slave machine is the optimizer 1-1. After the photovoltaic system is started up and runs, the inverter 104 regularly or periodically sends a heartbeat frame to the optimizer 1-1. After receiving the heartbeat frame, the optimizer 1-1 sends feedback information to the inverter 104. If the inverter 104 fails to receive the feedback information, the inverter 104 takes a remedial measure such as a reconnection attempt.

In an implementation, in the heartbeat protection mechanism, the master machine is the inverter 104, and the slave machine is the optimizer 1-1. After the photovoltaic system is started up and runs, the inverter 104 regularly or periodically sends a heartbeat frame to the optimizer 1-1, and the optimizer 1-1 does not send feedback information to the inverter 104, but performs a corresponding operation on the optimizer 1-1 end according to different cases in which whether the heartbeat frame is received.

In the embodiments, in addition to the heartbeat frame, after the inverter detects a fault or receives a regulation instruction delivered by a user, the inverter 104 further sends a voltage adjustment instruction to the optimizer 1-1. The voltage adjustment instruction may indicate the optimizer 1-1 to regulate the direct current conversion unit 101, so that the optimizer 1-1 outputs a specific voltage or current. A frequency of the heartbeat frame may be the same as or different from a frequency of the voltage adjustment instruction.

The inverter 104 and the optimizer perform data exchange by using the signal transceiver unit 108 on the inverter 104 side and the signal processing unit 103 of the optimizer 1-1. A communication manner of the data exchange is PLC. A PLC signal used for data exchange includes a heartbeat frame and a voltage adjustment instruction, and both the heartbeat frame and the voltage adjustment instruction belong to periodic communication signals. The entire communication process is as follows.

During running of the inverter 104 and the optimizer, the signal transceiver unit 108 sends, in the PLC manner, a PLC signal superimposed by the heartbeat frame and the voltage adjustment instruction to each optimizer in a broadcasting manner. After receiving the PLC signal, the signal processing unit 103 processes the PLC signal, and sends the processed PLC signal to the control unit 102 inside the optimizer. The control unit 102 controls work of the direct current conversion unit 101 based on the processed PLC signal, adjusts an output voltage or an output current of the optimizer.

The following uses only the optimizer 1-1 as an example for description. It should be understood that all optimizers that belong to a same photovoltaic string can receive the PLC signal, and the following does not describe working principles of other optimizers in the same photovoltaic string in detail.

In the photovoltaic system in this embodiment, the optimizer 1-1 switches different working modes of the optimizer based on the received heartbeat frame and the received voltage adjustment instruction. The working modes include a normal working mode, a safe working mode, and a shutdown mode. The following first describes a data communication manner and a working principle of the inverter and the optimizer device in the three different working modes.

Normal working mode: In the normal working mode, the inverter 104 sends a periodic heartbeat frame to the optimizer in a PLC manner. In this mode, the optimizer 1-1 successfully receives the periodic heartbeat frame from the inverter 104. Based on that the periodic heartbeat frame is successfully received and the voltage adjustment instruction fails to be received, the optimizer determines that communication between the optimizer 1-1 and the inverter 104 is normal and the normal working mode needs to be executed. In this mode, to increase a power input of the inverter 104, the optimizer 1-1 outputs relatively large power as much as possible. For example, the optimizer 1-1 controls an input end voltage of the optimizer 1-1 to be at a maximum power point voltage of the photovoltaic module or approach a maximum power point near a maximum power point voltage, and the direct current conversion unit 101 works in the MPPT tracking mode. A common case in which the optimizer 1-1 is triggered to perform the normal working mode includes that light reaches an initial threshold of light intensity in the morning and that the photovoltaic power generation system of the user is started up. In the morning, when the photovoltaic module receives light that exceeds the initial light intensity threshold, the inverter and the optimizer are powered on and start to work, and the inverter starts to send the PLC signal to the optimizer. After receiving the periodic heartbeat frame, the optimizer determines that communication between the inverter and the optimizer is normal, and starts to perform the normal working mode to output a voltage. When the user starts up, the user actively closes a direct current switch of the inverter 104. The direct current switch is installed on the inverter 104 side. After the direct current switch is closed, an electrical connection is formed between the optimizer 1-1 and the inverter 104. The optimizer 1-1 successfully receives the heartbeat frame from the inverter 104. After the optimizer 1-1 receives the periodic heartbeat frame, the optimizer 1-1 executes the normal working mode to output a voltage.

Safe working mode: In the safe working mode, the optimizer 1-1 still receives the periodic heartbeat frame from the inverter 104, and determines, based on the successfully received periodic heartbeat frame, that communication between the optimizer 1-1 and the inverter 104 is normal. However, in this mode, in addition to the heartbeat frame, the inverter 104 further sends a periodic voltage adjustment instruction in the PLC manner. After successfully receiving the periodic voltage adjustment instruction, the optimizer 1-1 determines, based on the successfully received the periodic heartbeat frame and the successfully received periodic voltage adjustment instruction, that communication between the optimizer 1-1 and the inverter 104 is normal and the safe working mode needs to be executed. In this mode, the optimizer 1-1 limits an output end voltage or current of the optimizer 1-1 based on the voltage adjustment instruction. For example, the output voltage of the optimizer 1-1 is limited to a specific voltage, and the direct current conversion unit 101 is controlled to be in the voltage limiting mode. In the voltage limiting mode, the input voltage of the inverter is also limited, so that protection is implemented for an inverter-side device in the photovoltaic system. It should be understood that, in the safe working mode, a specific value of the specific voltage may be adjusted, and the specific value of the specific voltage is affected by factors such as a local standard of product installation and a quantity of optimizers. A setting of the specific value of the specific voltage can meet that the inverter side device is not damaged. In addition, a case in which the optimizer 1-1 is triggered to perform the safe working mode is complex. The following describes a plurality of cases in which the safe working mode is triggered with reference to FIG. 4.

Shutdown mode: In the shutdown mode, the optimizer 1-1 fails to receive the heartbeat frame from the inverter 104 within a time period. The time period includes a time period of M times a period of the heartbeat frame, where M is a constant. The time period may also be a preset time period, and depends on stability of PLC in a working environment in which the optimizer is located. Higher stability indicates a longer time period, and lower stability indicates a shorter time period, to fully ensure normal communication between the optimizer and the inverter. Then, it is determined, based on that the periodic heartbeat frame is not successfully received, that communication between the optimizer 1-1 and the inverter 104 is abnormal, the inverter 104 cannot effectively control the optimizer 1-1, and the optimizer 1-1 controls an output voltage to be a shutdown voltage, where the voltage is a voltage preset by the optimizer 1-1 before delivery, and a preset low voltage range is 1 to 48 volts. In this case, there is no danger even if a person directly touches an output port of the photovoltaic string, thereby ensuring safety of the user and the maintenance personnel to the greatest extent. A common case in which the optimizer 1-1 is triggered to perform the shutdown mode includes that the user manually shuts down the inverter 104. In this case, the user actively turns off the direct current switch of the inverter 104, and the direct current switch is installed on the inverter 104 side. After the direct current switch is turned off, an electrical connection between the optimizer 1-1 and the inverter 104 is disconnected, and the optimizer 1-1 cannot receive the heartbeat frame from the inverter 104 anymore. After the optimizer 1-1 fails to receive the heartbeat frame from the inverter 104 for more than a fixed time, the optimizer 1-1 executes the shutdown mode.

In the foregoing three working modes, the optimizer chooses to maintain a current working mode or switch to another working mode based on different statuses of received PLC signals. In some embodiments, if the PLC signal received by the optimizer 1-1 before a time period t1 includes the heartbeat frame but does not include the voltage adjustment instruction, the optimizer 1-1 keeps working in the normal working mode. If the PLC signal received by the optimizer within a time period t1 to t2 includes both the heartbeat frame and the voltage adjustment instruction, the optimizer switches to the safe working mode at a moment t2. If the PLC signal received by the optimizer in a time period t2 to t3 includes the heartbeat frame and the voltage adjustment instruction, the optimizer keeps in the safe working mode. If the PLC signal received by the optimizer in a time period t3 to t4 includes the heartbeat frame but fails to receive the voltage adjustment instruction, the optimizer switches from the safe working mode to the normal working mode at a moment t4. If the optimizer fails to receive the PLC signal within a time period from t4 to t5, that is, does not receive the heartbeat frame, the optimizer chooses to switch from the normal working mode to the shutdown mode at a moment t5, where t1 to t5 occur sequentially, and time periods between every two moments may be equal or may not be equal.

A main difference between the foregoing three working modes lies in control of an output voltage state change of the optimizer 1-1. Actually, different working modes are respectively corresponding to different output voltage states of the optimizer 1-1. In descriptions of some embodiments, a specific embodiment may be described as follows: The optimizer 1-1 directly adjusts the output voltage based on whether the heartbeat frame signal and the voltage adjustment instruction are received, without reflecting changes of different working modes at the same time.

For example, in response to that some or all of the plurality of optimizers 1-1 fail to receive a periodic PLC signal or a heartbeat frame from the inverter 104 within a time period, the optimizer 1-1 that fails to receive the signal adjusts an output voltage of the output end of the optimizer 1-1 to a shutdown voltage, where the shutdown voltage is a preset safe voltage value.

In response to that some or all of the plurality of optimizers 1-1 receive the heartbeat frame from the inverter 104 and fail to receive the voltage adjustment instruction, the corresponding optimizer 1-1 controls an output voltage to be less than or equal to a first voltage.

In response to that all or some of the plurality of optimizers 1-1 receive the heartbeat frame and receive the voltage adjustment instruction, a corresponding optimizer controls an output voltage to be less than or equal to a second voltage, where the second voltage is less than the first voltage, and the second voltage is greater than the shutdown voltage.

It can be understood that, in the foregoing photovoltaic system, the optimizer 1-1 determines different working states of the inverter 104 or different requirements for an upstream power input based on a change of the PLC signal, to adjust a corresponding working state of the optimizer 1-1 in time, thereby effectively and timely protecting the inverter 104 under various different working conditions. In this embodiment, a voltage adjustment instruction is loaded in communication between the optimizer and the inverter of the photovoltaic system, for example, PLC, so that the optimizer can adjust an output voltage to a safe range in time after a fault such as an overvoltage, an overcurrent, or leakage occurs in the inverter, thereby effectively protecting a downstream inverter device in time and improving running security of the entire photovoltaic system.

Figure 4:
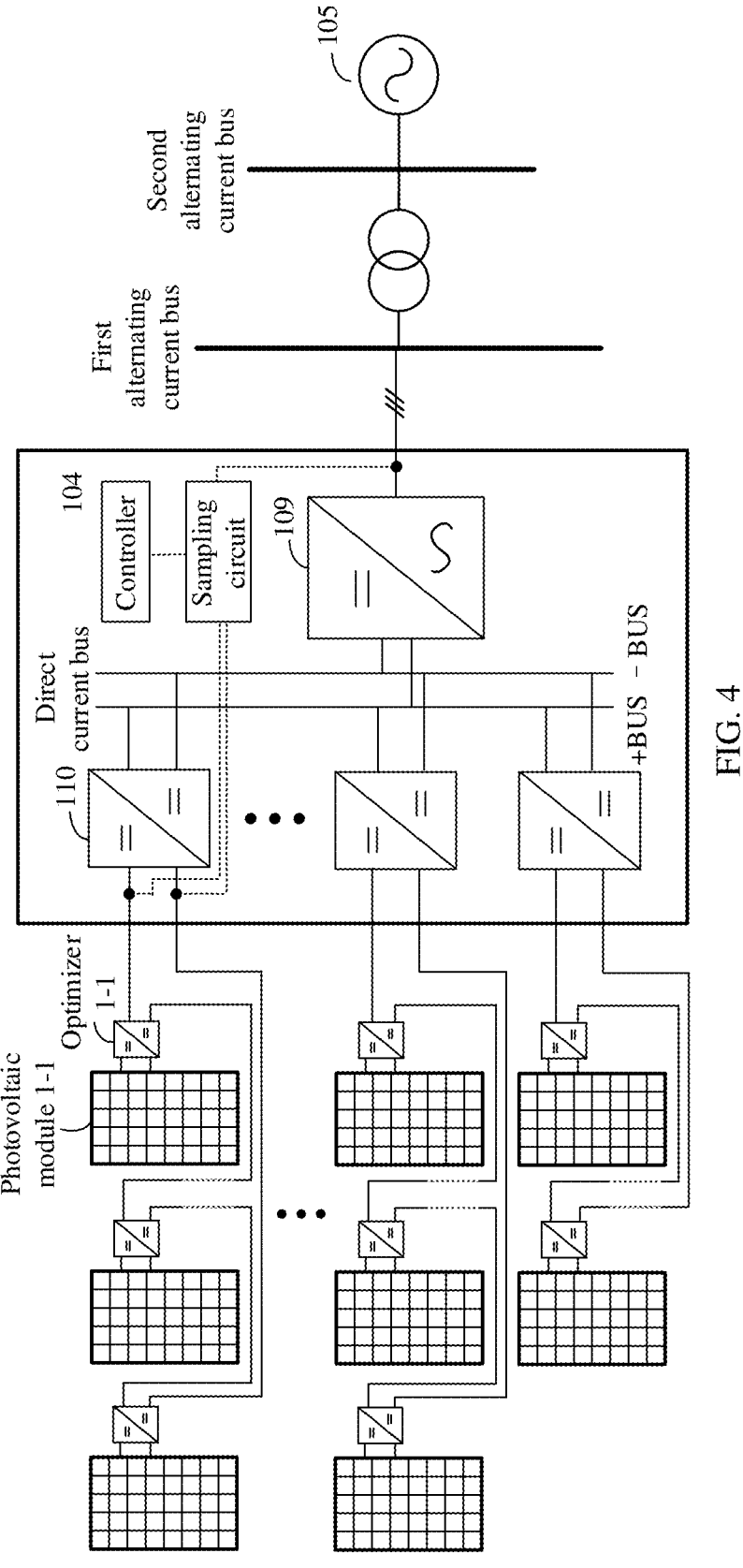
FIG. 4 is a schematic diagram of another optimizer-inverter connection according to an embodiment.

The following describes, with reference to FIG. 4, a plurality of cases of triggering a safe working mode according to an embodiment. FIG. 4 is a schematic diagram of still another optimizer-inverter connection according to this embodiment. In addition to a photovoltaic module and an optimizer, a photovoltaic power generation system shown in FIG. 4 further includes an inverter 104, a first alternating current bus, a second alternating current bus, and a power grid 105. The inverter 104 includes a direct current conversion circuit 110, a direct current bus, an inverter circuit 109, a sampling circuit, and a controller. As shown in FIG. 4, input ends of the inverter 104 are connected to three photovoltaic strings. For example, each photovoltaic string is connected to a corresponding direct current conversion circuit 110. The direct current conversion circuit 110 combines a converted direct current to the direct current bus, and the inverter circuit obtains power from the direct current bus, converts the direct current into an alternating current, and then transfers the alternating current to the first alternating current bus, and then transfers the direct current to the power grid 105. In some photovoltaic power generation systems with high power generation, a low-voltage alternating current on the first alternating current bus is further transferred to the second alternating current bus after being boosted by a transformer, and then transfers the direct current to the power grid 105. The sampling circuit in the inverter may collect electrical data such as a voltage, a current, and power at an input end (or an output end of the photovoltaic string) of the direct current conversion circuit 110 and an output end of the inverter circuit 109 in real time, and then transmit the collected data to the controller in the inverter. The controller determines a working state of the inverter based on the electrical data collected in real time, and delivers different instructions to electrical elements in the inverter based on different working states, to execute an optimal operation strategy.

In some possible embodiments, the inverter 104 may deliver a voltage adjustment instruction to an optimizer 1-1 in the following cases: (1) An input end overvoltage occurs in the inverter 104. (2) Input end overpower occurs in the inverter 104. (3) An islanding effect occurs in the inverter 104.

The following briefly describes the foregoing three cases.

(1) The input end overvoltage occurs in the inverter 104. The controller detects that an input end voltage of the direct current conversion circuit 110 exceeds a preset voltage threshold, and determines that the input end overvoltage occurs in the inverter 104. The preset voltage threshold is related to a hardware circuit bearing capacity of the inverter 104. For a single-phase inverter, the preset voltage threshold is 600 V, and for a three-phase inverter, the preset voltage threshold is 1100 V. If the preceding voltage threshold is exceeded, the inverter may be faulty or damaged. When the input end overvoltage occurs in the inverter, when the optimizer is switched to the safe working mode, an output voltage of the optimizer may be adjusted to K times a current voltage, where K is less than 1, and K depends on a specific value of a safe voltage at an input side of the inverter. In an embodiment, K is 0.5 times or 0.1 times, to protect the inverter. For example, to exclude an occasional power fluctuation of the power generation system, the optimizer switches the optimizer to the safe working mode only after a case in which the input end voltage of the direct current conversion circuit 110 exceeds the preset voltage threshold for a period of time.

(2) The input end overpower occurs in the inverter 104. During design and implementation of the photovoltaic system, to make full use of the inverter, the inverter is generally allowed to have a specific power over-ratio. For example, in the photovoltaic system, theoretical maximum input power of a photovoltaic module is 12 kW, and maximum allowed input power of the inverter is 10 KW. Therefore, the power over-ratio of the inverter is a ratio of 12 kW to 10 KW, that is, 1.2. In a general light condition, actual output power of the photovoltaic module is less than 10 kW. In this case, the inverter can work normally. However, when the light condition keeps good for a long time, and the actual output power of the photovoltaic module is greater than 10 kW for a long time, the inverter keeps in an overloaded working state for a long time. In this case, the input power of the inverter needs to be limited. In this embodiment, the output voltage adjustment instruction is delivered to the optimizer 1-1 to limit the output voltage of the inverter, so as to limit the power of the inverter, so as to protect the inverter.

(3) The islanding effect occurs in the inverter 104. Due to a fault of the power grid or the like, the photovoltaic power generation system in which the inverter 104 is located is completely independent of the power grid. The inverter 104 identifies that the islanding effect has occurred in the inverter 104. To avoid an excessively large fluctuation of a voltage and a frequency in an islanding system to damage an electrical device, the inverter 104 delivers the voltage adjustment instruction to the optimizer 1-1 based on this case.

To meet an input requirement of the inverter 104, the optimizer 1-1 generally sets a voltage limiting point of the optimizer 1-1 based on a quantity of optimizers 1-1 in the photovoltaic string and an input voltage limit of the inverter 104 when the optimizer 1-1 works normally. After the photovoltaic power generation system starts to work normally, the optimizer 1-1 limits the output voltage of the optimizer 1-1 to be below the voltage limiting point. For example, if an input voltage of the inverter 104 is limited to 500 V, and 10 inverters 104 are connected to the input end of the inverter 104, the optimizer 1-1 should set the voltage limiting point of the optimizer 1-1 to 50 V, so that the optimizer 1-1 outputs a voltage less than 50 V in a working process. For example, the voltage limiting point of the optimizer 1-1 is 50 V. The embodiments provide the following two methods to set the voltage limiting point of the optimizer 1-1. Method 1: After the optimizer 1-1 is installed for the first time and started up and debugged, the voltage limiting point of the optimizer 1-1 is set to 50 V based on the quantity of optimizers 1-1 and a system voltage limit. Then, voltage limiting point data is stored in the optimizer 1-1. When the optimizer 1-1 works subsequently, the data can be directly invoked from the optimizer 1-1, and the voltage limiting point does not need to be set again. This method is simple and has a good effect. Method 2: The voltage limiting point data that needs to be set by the optimizer 1-1 is delivered by the inverter 104, and is not stored in the optimizer 1-1. In this method, when the inverter 104 and the optimizer 1-1 work normally, the inverter 104 periodically delivers a voltage limiting point signal of 50 V to the optimizer 1-1, and the optimizer 1-1 receives the voltage limiting point signal and keeps the output voltage not exceeding 50 V during working.

It should be understood that the voltage limiting point signal in the foregoing method 2 may still occur in the safe working mode of the optimizer 1-1 provided in the embodiments. However, the voltage limiting point signal in the method 2 has at least one obvious difference from the voltage adjustment instruction in the safe working mode, that is, triggering conditions are different. The triggering condition of the voltage limiting point signal is that both the inverter 104 and the optimizer 1-1 work normally. The triggering condition of the voltage adjustment instruction is that the inverter is faulty, and the specific fault types include the three types of inverter faults: (1) The input end overvoltage occurs in the inverter 104. (2) The input end overpower occurs in the inverter 104. (3) The islanding effect occurs in the inverter 104.

With reference to the voltage limiting point of the optimizer, in an implementation, a first voltage is a voltage corresponding to the voltage limiting point of the optimizer. The optimizer is configured to adjust an input voltage of the optimizer within the first voltage or a voltage limiting point range, to perform maximum power tracking MPPT on a power output of a connected photovoltaic module. A shutdown voltage is a preset safe voltage value, and a second voltage is between the first voltage and the shutdown voltage. The first voltage may be a preset fixed value, or may be adjusted and updated based on a requirement of the optimizer or an instruction of the inverter. When a signal processing unit of the optimizer fails to receive a periodic communication signal within a time period, an output voltage of a power conversion device is controlled to be the shutdown voltage; when the signal processing unit of the optimizer receives the periodic communication signal but the periodic communication signal does not include the voltage adjustment instruction, the output voltage of the power conversion device is controlled to be less than or equal to the first voltage; or when the signal processing unit of the optimizer receives the periodic communication signal and the periodic communication signal includes the voltage adjustment instruction, the output voltage of the power conversion device is controlled to be less than or equal to the second voltage. In an implementation, the second voltage is P times the first voltage, where P<1, and P includes 0.5 or 0.1.

In an example, in the safe working mode, because only an output voltage or current of the optimizer 1-1 is limited, the direct current conversion unit 101 is not completely powered off. When the optimizer 1-1 changes from receiving a heartbeat frame and a voltage adjustment instruction that are periodically sent to receiving only a heartbeat frame from the inverter 104, the control unit 102 in the optimizer 1-1 may quickly restore the direct current conversion unit 101 from the voltage limiting mode to the MPPT tracking mode by changing a duty ratio or the like, the optimizer 1-1 also quickly switches from the safe working mode to the normal working mode. Therefore, the photovoltaic string in which the optimizer 1-1 is located still has a capability of quickly recovering to output a high voltage, so that the inverter 104 can also recover a normal output in a short time.

Similarly, in the normal working mode, the direct current conversion unit 101 is in the MPPT tracking mode, the inverter 104 periodically sends a heartbeat frame to the optimizer 1-1, and the optimizer 1-1 receives the periodical heartbeat frame. When the optimizer 1-1 changes from receiving only the periodical heartbeat frame to receiving a voltage adjustment instruction from the inverter 104 in addition to receiving the heartbeat frame from the inverter 104, the control unit 102 in the optimizer 1-1 may quickly switch the direct current conversion unit 101 from the MPPT tracking mode to the voltage limiting mode by changing a duty ratio, and the optimizer 1-1 also quickly switches from the normal working mode to the safe working mode, thereby ensuring security of the inverter device in time when a fault occurs.

In this embodiment, the optimizer 1-1 may quickly switch between the normal working mode, the safe working mode, and the shutdown mode, so that when the photovoltaic system is faulty, an output voltage of the photovoltaic string is quickly reduced, and security of the inverter is ensured. In scenarios such as installation and maintenance of the optimizer 1-1, the output voltage of the photovoltaic string is limited to a safe voltage, and personal safety is ensured. When a power generation scenario of the optimizer changes, the working mode of the optimizer is quickly switched. This embodiment can fully ensure security of the inverter device, can fully ensure safety of the user and the maintenance personnel, and can further greatly reduce impact of work such as overhauling, installation, and maintenance on user power consumption.

The following describes, with reference to a flowchart, a method for controlling working of an optimizer provided in embodiments.

Figure 5:
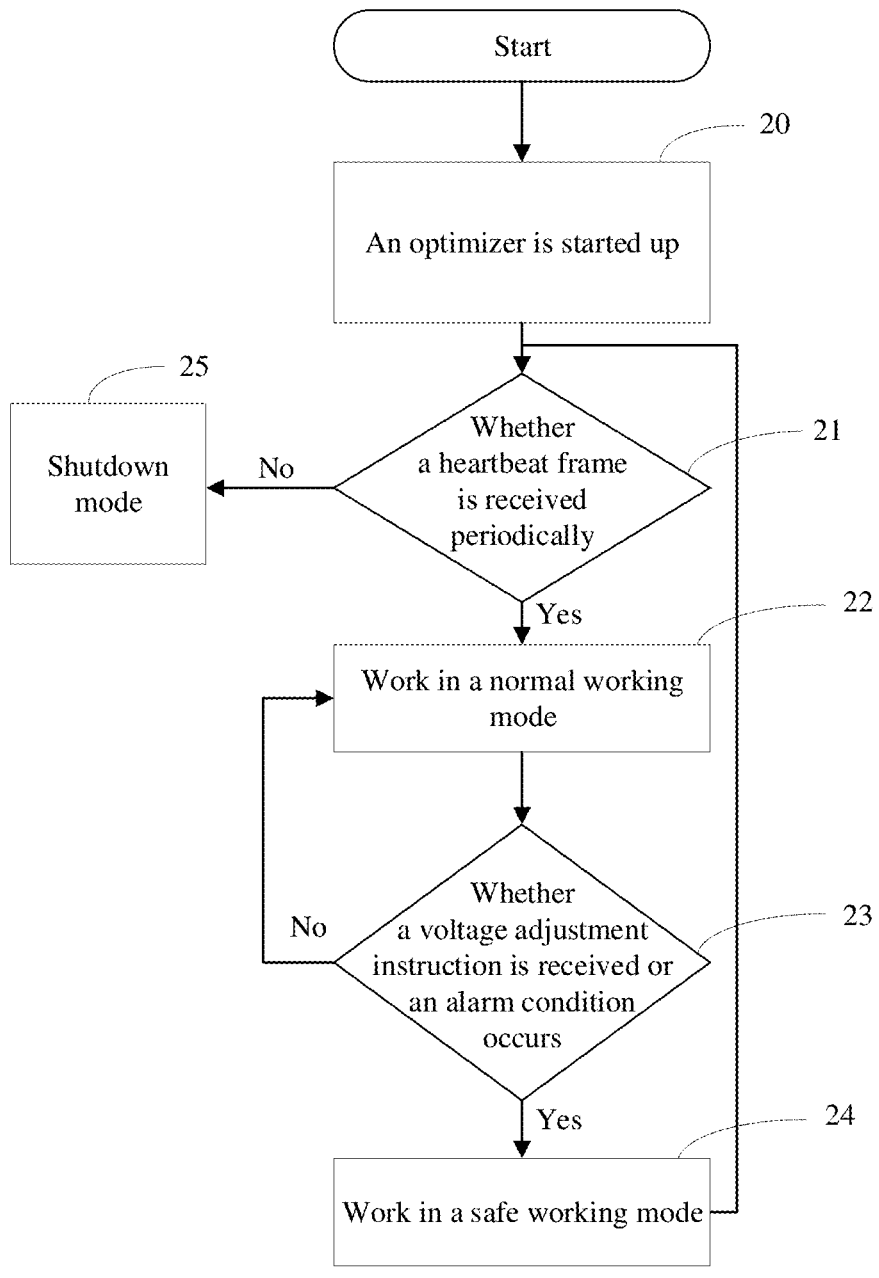
FIG. 5 is a schematic flowchart of switching an optimizer working mode according to an embodiment.

FIG. 5 is a schematic flowchart of switching a working mode of an optimizer according to an embodiment. In step 20, the optimizer is started up. In this case, a corresponding actual scenario may be that when the sun rises in the morning, sunlight provides sunlight for a photovoltaic module for energy conversion, and the optimizer has electric energy required for startup. Optionally, the optimizer further receives a startup instruction sent by an inverter. Then, the optimizer performs step 21. In this step, the optimizer determines whether a heartbeat frame is received periodically. Herein, a case in which the heartbeat frame is received periodically includes that the optimizer receives a heartbeat frame signal sent at a specific frequency within a period of time. If the condition is met, step 22 is performed. If the condition is not met, for example, the frequency of the heartbeat frame is not a specific frequency, a time of receiving the heartbeat frame does not meet the condition of the foregoing period of time, or the heartbeat frame signal is not received, step 25 is performed. In step 25, the optimizer performs a shutdown action. In the shutdown mode, a voltage output by the output end of the optimizer is a preset voltage of the optimizer before delivery. The voltage may be greater than an output voltage of the optimizer in the safe mode, or may be less than an output voltage of the optimizer in the safe mode, but need to be less than a voltage of a voltage limiting point of the optimizer. Under a shutdown voltage, even if a plurality of optimizers are connected in series in a photovoltaic string, a voltage on a power line of the inverter does not exceed the safe voltage. Even if a user or maintenance personnel directly touch the power line, electric shocks will not occur. In step 22, the optimizer works in a normal working mode. In the normal working mode, the optimizer generally performs an MPPT function. The optimizer regulates an input voltage of the optimizer to be a working voltage corresponding to a maximum power point in a photovoltaic module power characteristic curve, and the output voltage of the optimizer fluctuates within a specific range based on a requirement of a power conversion device and an electrical characteristic of the photovoltaic string. Then, the optimizer performs step 23. In this step, the optimizer determines whether a voltage adjustment instruction is received or an alarm condition occurs. If yes, the optimizer performs step 24. If no, the optimizer returns to step 22. The voltage adjustment instruction herein is a PLC signal sent by the inverter to the optimizer when the foregoing three faults occur. In step 24, the optimizer works in a safe working mode. In this mode, the optimizer regulates and controls a duty ratio of power conversion performed inside the optimizer, for example, a duty ratio changes relative to the normal working mode, so as to limit an output of the optimizer, keep the output voltage of the optimizer to a specific voltage, and limit the input voltage of the inverter, thereby ensuring device security of the inverter.

In the foregoing various working modes, the optimizer reports a running state of the optimizer to a northbound device. In this embodiment, when the optimizer is in the shutdown mode, the optimizer reports a "shutdown" state; when the optimizer is in the normal working mode and the safe working mode, the optimizer reports a "running" state; and when a fault occurs, the optimizer reports a "faulty" state.

Figure 6:
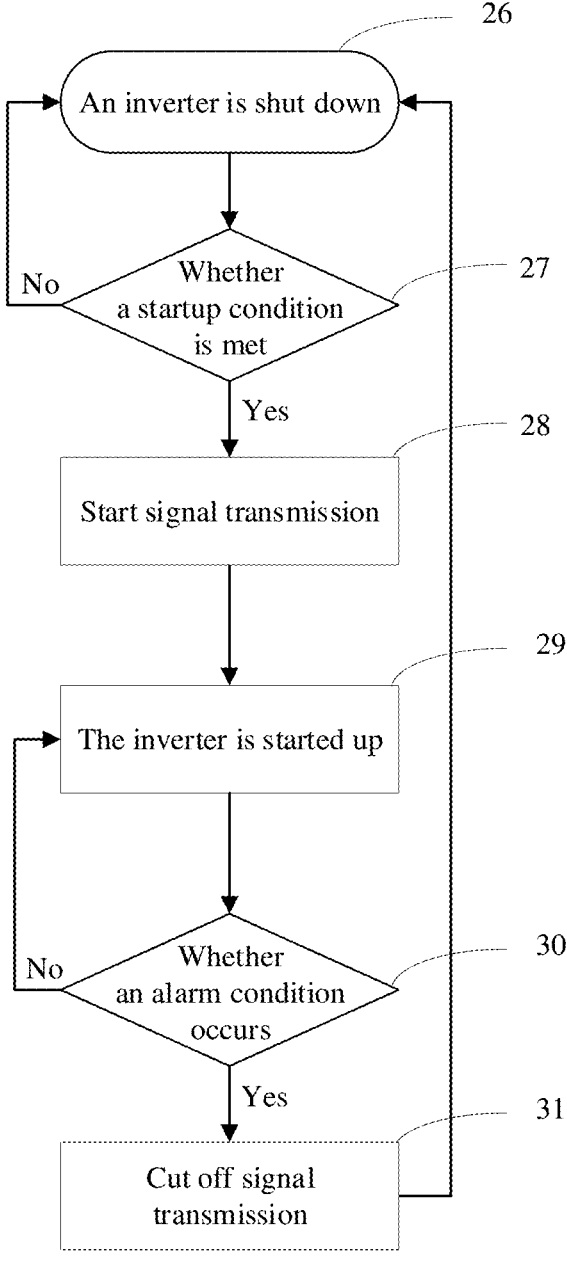
FIG. 6 is a schematic diagram of a working procedure of an inverter according to an embodiment.

FIG. 6 is a schematic diagram of a working procedure of an inverter according to an embodiment. In step 26, an inverter is in a shutdown state. In this case, a corresponding actual scenario may be that there is no sunlight or the sunlight is weak at night, or a user disconnects a direct current switch on an inverter side, and the inverter is not powered on, or a voltage of the inverter is insufficient to support power-on and working of components used for signal transmission in the inverter. Then, step 27 is performed. The inverter continuously determines whether the inverter meets a startup condition. When the sunlight is strong or the user turns on the direct current switch on the inverter side, so that a voltage of the inverter rises to a voltage used by the inverter for signal transmission, and the inverter performs step 28 to start signal transmission with the optimizer. Signals transmitted between the inverter and the optimizer include the heartbeat frame, the voltage adjustment instruction, and the voltage limiting point signal. When determining that the inverter still does not meet the startup condition at a current moment, the inverter returns to perform step 26. After the inverter starts signal transmission, step 29 is performed to start up the inverter. In this case, all components in the inverter basically start to work. The optimizer continuously inputs direct currents to the inverter, and the inverter continuously outputs alternating currents required by a user load. Then, step 30 is performed. The inverter determines whether an alarm condition occurs in the inverter. If no alarm condition occurs, the inverter returns to perform step 29. If an alarm condition occurs, it indicates that the inverter is no longer suitable to continue to provide an alternating current to the user load under the current condition, and shutdown should be performed in time. Otherwise, internal electrical components of the inverter will be burned, and in severe cases, a fire will occur, threatening users' lives and property safety. After the alarm condition occurs, the inverter performs step 31, that is, cuts off signal transmission. After cutting off signal transmission, the inverter returns to perform step 26, and the inverter is shut down.

A person of ordinary skill in the art may be aware that, in combination with the examples described in embodiments, units and algorithm steps may be implemented by electronic hardware or a combination of computer software and electronic hardware. Whether the functions are performed by hardware or software depends on particular applications and design constraint conditions of the solutions. A person skilled in the art may use different methods to implement the described functions for each particular application, but it should not be considered that the implementation goes beyond the scope of the embodiments.

The foregoing descriptions are merely specific implementations of embodiments, but their scope is not limited thereto. Any variation or replacement readily figured out by a person skilled in the art within the scope of the embodiments shall fall within their scope.

What is claimed is:

1. A power conversion device, comprising:

a direct current conversion unit configured to convert a direct current generated by a photovoltaic module and output a converted direct current to a next-level power conversion device;

a signal processing unit connected to an output of the power conversion device, and configured to receive a periodic communication signal sent by the next-level power conversion device; and a controller configured to:

when the signal processing unit fails to receive the periodic communication signal within a time period, control an output voltage of the power conversion device to be a shutdown voltage, wherein the shutdown voltage is a preset safe voltage value; and when the signal processing unit receives the periodic communication signal but the periodic communication signal does not comprise a voltage adjustment instruction, control the output voltage of the power conversion device to be less than or equal to a first voltage; and when the signal processing unit receives the periodic communication signal and the periodic communication signal comprises the voltage adjustment instruction, control the output voltage of the power conversion device to be less than or equal to a second voltage, wherein the second voltage is less than the first voltage, and the second voltage is greater than the shutdown voltage.

2. The power conversion device according to claim 1, wherein the periodic communication signal is a power line communication (PLC) signal, and the PLC signal comprises a heartbeat frame; and the controller is further configured to:

when the signal processing unit fails to receive the heartbeat frame within a time period, control the output voltage of the power conversion device to be the shutdown voltage.

3. The power conversion device according to claim 2, wherein the controller is further configured to:

when the signal processing unit receives the PLC signal and that the PLC signal comprises the heartbeat frame but does not comprise the voltage adjustment instruction, control the output voltage of the power conversion device to be less than the first voltage; or when the signal processing unit receives the PLC signal and the PLC signal comprises both the heartbeat frame and the voltage adjustment instruction, control the output voltage of the power conversion device to be less than the second voltage.

4. The power conversion device according to claim 3, wherein the controller is further configured to:

when the signal processing unit receives the PLC signal and the PLC signal comprises both the heartbeat frame and the voltage adjustment instruction, adjust the output voltage of the power conversion device to K times a current output voltage of the power conversion device, wherein K is less than 1 or K is 0.5 or 0.1.

5. The power conversion device according to claim 1, wherein the controller is further configured to:

when the signal processing unit receives the periodic communication signal but the periodic communication signal does not comprise the voltage adjustment instruction, control the direct current conversion unit to work in a maximum power tracking mode, wherein an output voltage of the direct current conversion unit changes in the maximum power tracking mode, and output power of the photovoltaic module connected to the direct current conversion unit is maximum; or when the signal processing unit receives the periodic communication signal and the periodic communication signal comprises the voltage adjustment instruction, control the direct current conversion unit to work in a voltage limiting mode, wherein the output voltage of the direct current conversion unit is constant in the voltage limiting mode.

6. The power conversion device according to claim 2, wherein the controller is further configured to:

when the signal processing unit receives the periodic communication signal, but the periodic communication signal does not comprise the voltage adjustment instruction, control the direct current conversion unit to work in a maximum power tracking mode, wherein an output voltage of the direct current conversion unit changes in the maximum power tracking mode, and output power of the photovoltaic module connected to the direct current conversion unit is maximum; or when the signal processing unit receives the periodic communication signal and the periodic communication signal comprises the voltage adjustment instruction, control the direct current conversion unit to work in a voltage limiting mode, wherein the output voltage of the direct current conversion unit is constant in the voltage limiting mode.

7. The power conversion device according to claim 3, wherein the controller is further configured to:

when the signal processing unit receives the periodic communication signal, but the periodic communication signal does not comprise the voltage adjustment instruction, control the direct current conversion unit to work in a maximum power tracking mode, wherein an output voltage of the direct current conversion unit changes in the maximum power tracking mode, and output power of the photovoltaic module connected to the direct current conversion unit is maximum; or when the signal processing unit receives the periodic communication signal and the periodic communication signal comprises the voltage adjustment instruction, control the direct current conversion unit to work in a voltage limiting mode, wherein the output voltage of the direct current conversion unit is constant in the voltage limiting mode.

8. The power conversion device according to claim 4, wherein the controller is further configured to:

when the signal processing unit receives the periodic communication signal, but the periodic communication signal does not comprise the voltage adjustment instruction, control the direct current conversion unit to work in a maximum power tracking mode, wherein an output voltage of the direct current conversion unit changes in the maximum power tracking mode, and output power of the photovoltaic module connected to the direct current conversion unit is maximum; or when the signal processing unit receives the periodic communication signal and the periodic communication signal comprises the voltage adjustment instruction, control the direct current conversion unit to work in a voltage limiting mode, wherein the output voltage of the direct current conversion unit is constant in the voltage limiting mode.

9. A power conversion device control method, comprising:

when a power conversion device fails to receive a heartbeat frame, controlling an output voltage of the power conversion device to be a shutdown voltage, wherein the shutdown voltage is a preset safe voltage value; and when the power conversion device receives the heartbeat frame and fails to receive a voltage adjustment instruction, controlling the output voltage of the power conversion device to be less than or equal to a first voltage; and when the power conversion device receives the heartbeat frame and receives the voltage adjustment instruction, controlling the output voltage of the power conversion device to be less than or equal to a second voltage, wherein the second voltage is less than the first voltage, and the second voltage is greater than the shutdown voltage.

10. The method according to claim 9, wherein when it is detected that an input end voltage of an inverter exceeds an overvoltage threshold, the inverter is configured to receive direct current power output by the power conversion device and deliver the voltage adjustment instruction to the power conversion device; the power conversion device receives the voltage adjustment instruction, and controls the output voltage of the power conversion device to be less than the overvoltage threshold; and the power conversion device is connected to the inverter through a power line, and the heartbeat frame and the voltage adjustment instruction are transmitted through the power line.

11. The method according to claim 9, wherein when it is detected that input end power of an inverter exceeds an overpower threshold, the inverter is configured to receive direct current power output by the power conversion device and deliver the voltage adjustment instruction to the power conversion device; the power conversion device receives the voltage adjustment instruction, and controls the output voltage of the power conversion device to decrease; and the power conversion device is connected to the inverter through a power line, and the heartbeat frame and the voltage adjustment instruction are transmitted through the power line.

12. The method according to claim 9, wherein when it is detected that an islanding effect occurs in a power generation system in which an inverter is located, the inverter is configured to receive direct current power output by the power conversion device and deliver the voltage adjustment instruction to the power conversion device; the power conversion device receives the voltage adjustment instruction, and controls the output voltage of the power conversion device to decrease; and the power conversion device is connected to the inverter through a power line, and the heartbeat frame and the voltage adjustment instruction are transmitted through the power line.

13. A photovoltaic power generation system, comprising:

a plurality of optimizers configured to convert a direct current generated by a photovoltaic module and output a converted direct current to an inverter; and the inverter configured to supply power to a power grid or a user load, the inverter further configured to send a heartbeat frame and a voltage adjustment instruction to the plurality of optimizers, and the heartbeat frame and the voltage adjustment instruction are transmitted through a power line between the inverter and the optimizer, wherein when the plurality of optimizers fail to receive the heartbeat frame within a time period, output voltages of the plurality of optimizers are shutdown voltages, wherein the shutdown voltage is a preset safe voltage value; and when the plurality of optimizers receive the heartbeat frame but fail to receive the voltage adjustment instruction, the output voltages of the plurality of optimizers are less than or equal to a first voltage; and when the plurality of optimizers receive the heartbeat frame and receive the voltage adjustment instruction, the output voltages of the plurality of optimizers are less than or equal to a second voltage, wherein the second voltage is less than the first voltage, and the second voltage is greater than the shutdown voltage.

14. The photovoltaic power generation system according to claim 13, wherein when an input end voltage of the inverter exceeds an overvoltage threshold or input end power of the inverter exceeds an overpower threshold, the inverter delivers the voltage adjustment instruction to the optimizer, the optimizer receives the voltage adjustment instruction, and the optimizer controls the output voltage of the optimizer to be less than or equal to the second voltage.

15. The photovoltaic power generation system according to claim 13, wherein when a part of or all of the plurality of optimizers fail to receive the heartbeat frame within a time period, an optimizer that fails to receive the heartbeat frame adjusts the output voltage to the shutdown voltage, wherein the shutdown voltage is the preset safe voltage value;

when the plurality of optimizers receive the heartbeat frame but fail to receive the voltage adjustment instruction, the output voltages of the plurality of optimizers are less than or equal to the first voltage; or when the plurality of optimizers receive the heartbeat frame and receive the voltage adjustment instruction, the output voltages of the plurality of optimizers are less than or equal to the second voltage, wherein the second voltage is less than the first voltage, and the second voltage is greater than the shutdown voltage.

16. The photovoltaic power generation system according to claim 14, wherein when a part of or all of the plurality of optimizers fail to receive the heartbeat frame within a time period, an optimizer that fails to receive the heartbeat frame adjusts the output voltage to the shutdown voltage, wherein the shutdown voltage is the preset safe voltage value;

when the plurality of optimizers receive the heartbeat frame but fail to receive the voltage adjustment instruction, the output voltages of the plurality of optimizers are less than or equal to the first voltage; or when the plurality of optimizers receive the heartbeat frame and receive the voltage adjustment instruction, the output voltages of the plurality of optimizers are less than or equal to the second voltage, wherein the second voltage is less than the first voltage, and the second voltage is greater than the shutdown voltage.

17. The photovoltaic power generation system according to claim 13, wherein when an islanding effect occurs in a power generation system in which the inverter is located, the inverter delivers the voltage adjustment instruction to the optimizer, the optimizer receives the voltage adjustment instruction, and the optimizer controls the output voltage of the optimizer to be less than or equal to the second voltage.

18. The photovoltaic power generation system according to claim 13, wherein when the inverter meets a startup condition, the inverter sends the heartbeat frame or the voltage adjustment instruction to the optimizer; and when the inverter detects an alarm signal, the inverter stops sending the heartbeat frame or the voltage adjustment instruction to the optimizer, and performs a shutdown action.

19. The photovoltaic power generation system according to claim 13, wherein inputs of the plurality of optimizers are configured to be respectively connected to photovoltaic modules, and outputs of the plurality of optimizers are connected in series and then connected to an input of the inverter; and the inverter is configured to send the heartbeat frame and the voltage adjustment instruction to the plurality of optimizers in a broadcasting manner through PLC, and the voltage adjustment instruction is used to adjust the output voltages of the plurality of optimizers to K times current output voltages of the plurality of optimizers, wherein K is less than 1 or K is 0.5 or 0.1.

20. The photovoltaic power generation system according to claim 18, wherein inputs of the plurality of optimizers are configured to be respectively connected to photovoltaic modules, and outputs of the plurality of optimizers are connected in series and then connected to an input of the inverter; and the inverter is configured to send the heartbeat frame and the voltage adjustment instruction to the plurality of optimizers in a broadcasting manner through PLC, and the voltage adjustment instruction is used to adjust the output voltages of the plurality of optimizers to K times current output voltages of the plurality of optimizers, wherein K is less than 1 or K is 0.5 or 0.1.

* * * * *